(12) United States Patent
Keam et al.

(10) Patent No.: US 10,228,849 B2
(45) Date of Patent: Mar. 12, 2019

(54) METHOD AND DEVICE FOR PROVIDING CONTROLLER

(71) Applicant: Samsung Electronics Co., Ltd., Suwon-si, Gyeonggi-do (KR)

(72) Inventors: Byeong Kuk Keam, Suwon-si (KR); Dong Kyung Kim, Yongin-si (KR); Dong Ik Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 219 days.

(21) Appl. No.: 15/133,771

(22) Filed: Apr. 20, 2016

(65) Prior Publication Data

US 2016/0313912 A1 Oct. 27, 2016

Related U.S. Application Data

(60) Provisional application No. 62/149,993, filed on Apr. 20, 2015.

(30) Foreign Application Priority Data

Sep. 25, 2015 (KR) .......................... 10-2015-0136465

(51) Int. Cl.
| | | |
|---|---|---|
| *G06F 3/048* | (2013.01) | |
| *G06F 3/0488* | (2013.01) | |
| *G06T 11/00* | (2006.01) | |
| *G06F 1/16* | (2006.01) | |
| *G06F 3/0484* | (2013.01) | |
| *G09G 5/00* | (2006.01) | |
| *A63F 13/327* | (2014.01) | |

(52) U.S. Cl.
CPC ........ *G06F 3/04886* (2013.01); *A63F 13/327* (2014.09); *G06F 1/1647* (2013.01); *G06F 3/04842* (2013.01); *G06F 3/04845* (2013.01); *G06T 11/001* (2013.01); *G09G 5/00* (2013.01); *A63F 2300/204* (2013.01)

(58) Field of Classification Search
CPC ...................................................... G06F 3/048
See application file for complete search history.

(56) References Cited

U.S. PATENT DOCUMENTS

| | | | | |
|---|---|---|---|---|
| 2013/0005469 A1* | 1/2013 | Selim | .................. | A63F 13/2145 463/37 |
| 2014/0011584 A1 | 1/2014 | Shin et al. | | |
| 2015/0182856 A1* | 7/2015 | Mays, III | ............ | A63F 13/2145 463/31 |

FOREIGN PATENT DOCUMENTS

| | | |
|---|---|---|
| KR | 10-2013-0040991 A | 4/2013 |
| KR | 10-2014-0000416 A | 1/2014 |

* cited by examiner

*Primary Examiner* — Pei Yong Weng
(74) *Attorney, Agent, or Firm* — Jefferson IP Law, LLP

(57) ABSTRACT

An electronic device is provided. The electronic device includes at least one display, a memory configured to store an application and a database including information on a plurality of controllers, and a processor, wherein the processor is configured to display a content including at least one object in relation to an execution of the application in a first area of the display, determine a controller corresponding to the application based on the database, and output the determined controller to a second area of the display.

20 Claims, 17 Drawing Sheets

METHOD AND DEVICE FOR PROVIDING CONTROLLER

CROSS-REFERENCE TO RELATED APPLICATION(S)

This application claims the benefit under 35 U.S.C. § 119 (e) of a U.S. Provisional application filed on Apr. 20, 2015 in the U.S. Patent and Trademark Office and assigned Ser. No. 62/149,993, and under 35 U.S.C. § 119(a) of a Korean patent application filed on Sep. 25, 2015 in the Korean Intellectual Property Office and assigned Serial number 10-2015-0136465, the entire disclosure of each of which is hereby incorporated by reference.

TECHNICAL FIELD

The present disclosure relates to a technique for providing a controller for application in an electronic device. More particularly, the present disclosure relates to a method of providing a controller for application control and a computer readable recoding medium.

BACKGROUND

In general, for a device like a typical gaming device, a controller for controlling an application is provided as hardware having a physical form (for example, a keyboard, a keypad, a mouse, a joystick, and a game pad). As gaming markets using mobile terminals such as smartphones or tablets become successful, electronic devices may provide software type gamepads operating by touch input, in addition to physical gamepads.

It is difficult for physical controllers to be customized for a user's desired form (for example, change a button configuration/position/color). Additionally, since the position/configuration of a main button to be utilized according to the characteristics of application varies, it is sometimes difficult for a user to adapt or manipulate.

Additionally, when a software type controller is used, only a controller pre-defined by application developers (or game producers) may be used.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and method for providing an appropriate controller according to the type of application and providing a controller changeable/definable according to a user's intent.

In accordance with an aspect of the present disclosure, an electronic device is provided. The electronic device includes at least one display, a memory configured to store an application and a database including information on a plurality of controllers, and a processor, wherein the processor is configured to display a content including at least one object in relation to an execution of the application in a first area of the display, determine a controller corresponding to the application based on the database, and output the determined controller to a second area of the display.

In accordance with another aspect of the present disclosure, a controller providing method of an electronic device is provided. The controller providing method includes executing an application, displaying a content including at least one object in relation to an execution of the application, in a first area of a display functionally connected to the electronic device, determining a controller for moving the at least one object based on a database, and outputting the determined controller to a second area of the display.

In accordance with another aspect of the present disclosure, a non-transitory storage medium is provided. The non-transitory storage medium includes a computer readable instruction for performing the above method.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
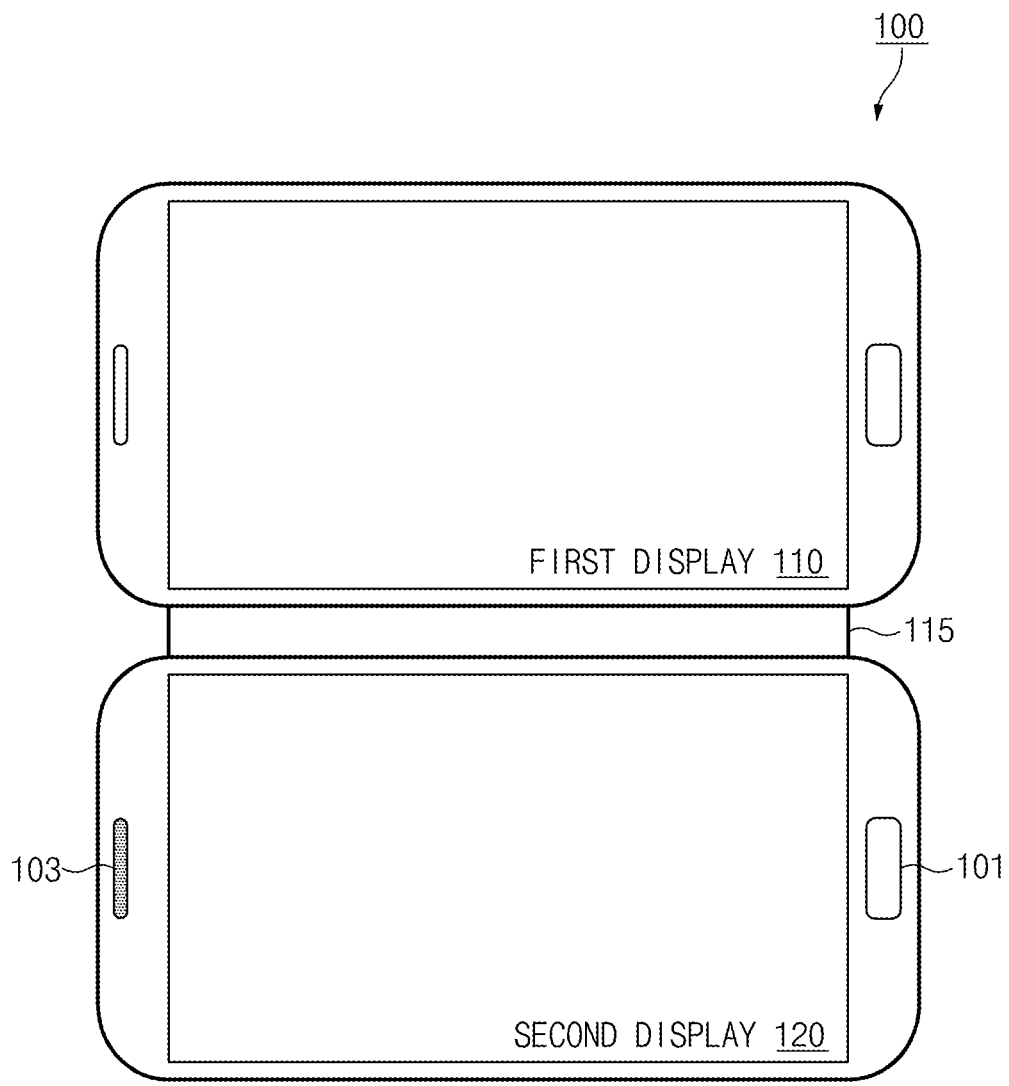
FIG. 1 is a view illustrating a form of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For instance, the expression "A or B", or "at least one of A or/and B" may indicate include A, B, or both A and B. For instance, the expression "A or B", or "at least one of A or/and B" may indicate (1) at least one A, (2) at least one B, or (3) both at least one A and at least one B.

The terms such as "1st", "2nd", "first", "second", and the like used herein may refer to modifying various different elements of various embodiments of the present disclosure, but do not limit the elements. For instance, "a first user device" and "a second user device" may indicate different users regardless of the order or the importance. For example, a first component may be referred to as a second component and vice versa without departing from the scope of the present disclosure.

In various embodiments of the present disclosure, it will be understood that when a component (for example, a first component) is referred to as being "(operatively or communicatively) coupled with/to" or "connected to" another component (for example, a second component), the component may be directly connected to the other component or connected through another component (for example, a third component). In various embodiments of the present disclosure, it will be understood that when a component (for example, a first component) is referred to as being "directly connected to" or "directly access" another component (for example, a second component), another component (for example, a third component) does not exist between the component (for example, the first component) and the other component (for example, the second component).

The expression "configured to" used in various embodiments of the present disclosure may be interchangeably used with "suitable for", "having the capacity to", "designed to", "adapted to", "made to", or "capable of" according to a situation, for example. The term "configured to" may not necessarily mean "specifically designed to" in terms of hardware. Instead, the expression "a device configured to" in some situations may mean that the device and another device or part are "capable of". For example, "a processor configured to perform A, B, and C" in a phrase may mean a dedicated processor (for example, an embedded processor) for performing a corresponding operation or a generic-purpose processor (for example, a central processing unit (CPU) or application processor (AP)) for performing corresponding operations by executing at least one software program stored in a memory device.

Terms used in various embodiments of the present disclosure are used to describe specific embodiments of the present disclosure, and are not intended to limit the scope of other embodiments. Unless otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning In any cases, even the terms defined in this specification cannot be interpreted as excluding embodiments of the present disclosure.

According to various embodiments of the present disclosure, electronic devices may include at least one of smartphones, tablet personal computers (PCs), mobile phones, video phones, electronic book (e-book) readers, desktop PCs, laptop PCs, netbook computers, workstation server, personal digital assistants (PDAs), portable multimedia player (PMPs), Moving Picture Experts Group (MPEG-1 or MPEG-2) audio layer 3 (MP3) players, mobile medical devices, cameras, and wearable devices. According to various embodiments of the present disclosure, the wearable devices may include at least one of accessory types (e.g., watches, rings, bracelets, anklets, necklaces, glasses, contact lenses, or head-mounted-devices (HMDs)), fabric or garment integrated types (for example, e-apparel), body-mounted types (for example, skin pads or tattoos), or bio-implantation types (for example, implantable circuits).

According to some embodiments of the present disclosure, an electronic device may be home appliance. The smart home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™ or Google TV™), game consoles (for example, Xbox™ and PlayStation™), electronic dictionaries, electronic keys, camcorders, and electronic picture frames.

An electronic device according to various embodiments of the present disclosure may be one of the above-mentioned various devices or a combination thereof. Additionally, an electronic device according to an embodiment of the present disclosure may be a flexible electronic device. Additionally, an electronic device according to an embodiment of the present disclosure is not limited to the above-mentioned devices and may include a new kind of an electronic device according to the technology development.

Hereinafter, an electronic device according to various embodiments of the present disclosure will be described in more detail with reference to the accompanying drawings. The term "user" in this disclosure may refer to a person using an electronic device or a device using an electronic device (for example, an artificial intelligent electronic device).

FIG. 1 is a view illustrating a form of an electronic device according to an embodiment of the present disclosure.

Referring to FIG. 1, an electronic device 100 may include a plurality of displays. For example, the electronic device 100 may include a first display 110 and a second display 120. The first display 110 and the second display 120 may be connected to each other through a connection part 115. The connection part 115 may be formed of various materials.

For example, the connection part 115 may be formed of plastic, metal, leather, and synthetic resin. According to another embodiment of the present disclosure, the first display 110 and the second display 120 may contact each other without the connection part 115. Besides that, the electronic device 100 may include a physical button 101 and a receiver 103 for another function (for example, a call). Various components not shown in FIG. 1 (for example, a touch button, a volume key, a camera, and a sensor disposed outside a display area) may be included in the electronic device 100 but detailed description is omitted to prevent the main idea of the present disclosure from being blurred.

According to an embodiment of the present disclosure, the execution screen of an application may be displayed on the first display 110. A control user interface (UI) for controlling the execution screen of an application may be outputted to the second display 120. For example, a racing game screen may be outputted to the first display 110 and a UI for controlling the racing game may be outputted to the second display 120. The UI, for example, may include a direction control menu (for example, an arrow key or a handle), a speed control menu (for example, an acceleration pedal or a brake), and a game control menu (for example, pause, save, and end). In this document, such a control UI is referred to as a controller and unless other defined, the controller may mean a software type control UI outputted to a display. For convenience of description, various embodiments are described based on a controller for controlling game applications but in the case of non-gaming applications, for example, composer or video editing applications using a control UI, various embodiments of the this document may be applied.

The electronic device 100 including two displays is shown in FIG. 1. However, in a modified embodiment, the electronic device 100 may include three or more displays. For example, when an electronic device includes a plurality of displays, a controller may be outputted to one of them and the execution screen of an application may be outputted to one of the remaining displays.

According to an embodiment of the present disclosure, when an electronic device includes one display, an embodiment of the present disclosure may be applied. For example, the execution screen of an application and a controller may be displayed on the same display. In this case, the execution screen of the application may be outputted to a first layer and the controller may be outputted to a second layer having a higher z-order than the first layer. According to another embodiment of the present disclosure, the electronic device 100 may divide one display into more than two areas and may output the execution screen of an application to a first area and output a control UI to a second area.

According to an embodiment of the present disclosure, when connected to another electronic device by using wired or wireless communication, the electronic device 100 may output (or transmit data to the external device to be outputted) the execution screen of an application to the screen (for example, a monitor, a TV, and so on) of an external device and output a controller to the display of the electronic device 100. That is, as an electronic device outputs a controller to its display and outputs an execution screen to a display of an external device functionally connected to the electronic device, an environment that a relatively large screen or a relatively free controller function is available may be provided. For example, when the electronic device 100 is coupled to a wearable device such as a HMD or connected through network, the execution screen of an application may be outputted to the wearable device and a controller may be outputted to the display of the electronic device 100.

Hereinafter, various embodiments of the present disclosure are described with reference to FIGS. 2 to 16. Although it is described for convenience that the electronic device 100 includes two displays, as mentioned above, the present disclosure may be applied to various forms of electronic devices.

Figure 2:
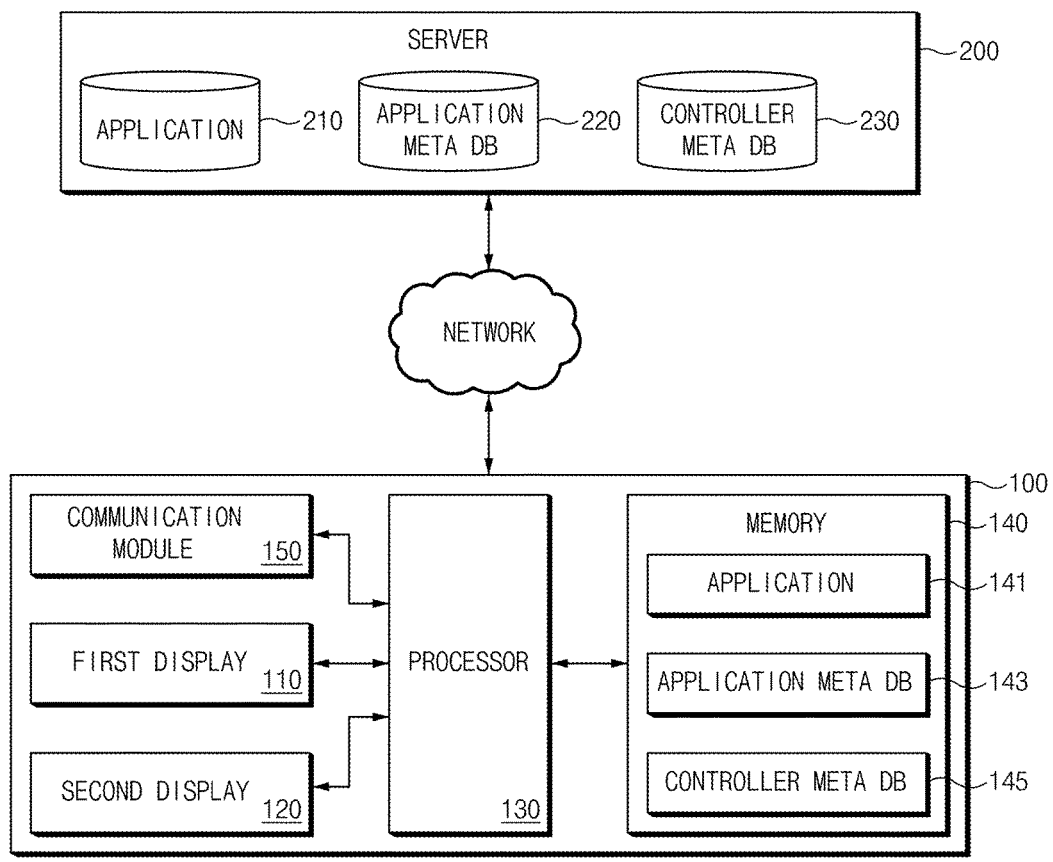
FIG. 2 is a view illustrating configurations of an electronic device and a server according to an embodiment of the present disclosure.

FIG. 2 is a view illustrating configurations of an electronic device and a server according to an embodiment of the present disclosure.

Referring to FIG. 2, the electronic device 100 may include a first display 110, a second display 120, a processor 130, a memory 140, and a communication module 150. The electronic device 100 may include an additional component or omit some components. Description for various hardware/software components applicable to the electronic device 100 is provided with reference to FIGS. 14, 15, and 16.

At least one of the first display 110 and the second display 120 may receive a user's touch input or hovering input. For example, the processor 130 may output the execution screen of an application to the first display 110 and output a controller corresponding to the application to the second display 120. In this case, the second display 120 may recognize at least user's touch input and hovering input. For example, the second display 120 may include a cover glass, a touch panel, and a display panel. When receiving a touch input or hovering input detected from a touch panel of the second display 120, the processor 130 perform calculation based on the input and output its result to the first display 110. Additionally, according to an embodiment of the present disclosure, the first display 110 also may recognize touch and hovering inputs.

The processor 130 may correspond to hardware with computing power such as an AP and a CPU. The processor 130 may be configured with at least one processor or at least one core. Additionally, according to an embodiment of the present disclosure, the processor 130 may be implemented in the form of an integrated chip such as a system on chip (SoC).

According to an embodiment of the present disclosure, the processor 130 may manage the provision of a controller appropriate for an application through a controller manager. The controller manager may be understood as a software module implementable by the processor 130. In this specification, it is understood that an operation for determining and managing a controller among operations performed by the processor 130 is performed by a controller manager.

The memory 140 may include an application 141, an application meta database (DB) 143, and a controller meta DB 145. The application 141, for example, may be a game application. As mentioned above, the application 141 may correspond to an arbitrary application for providing an execution screen and a controller for controlling the execution screen (for example, an execution result). For example, an application that a user utilizes for providing content service such as music or video in addition to game may correspond to the application 141.

The application meta DB 143 includes an application list that a user utilizes and includes an additional information field on each application. According to an embodiment of the present disclosure, the application meta DB 143 may be referred to as a first DB. The controller meta DB 145 may include a list of pre-defined controllers provided to a user, that is, outputted to the second display 120 and additionally include an appropriate additional information field. According to an embodiment of the present disclosure, the controller meta DB 145 may be referred to as a second DB. The processor 130 may refer to the application meta DB 143 and the controller meta DB 145 in order to determine a controller appropriate for the application 141. The application meta DB 143 and the controller meta DB 145 are described with reference to FIG. 4.

The electronic device 100 may communicate with the server 200 through a network. The server 200 may include an application 210, an application meta DB 220, and a controller meta DB 230. Additionally, according to an embodiment of the present disclosure, the server 200 may correspond to a plurality of servers. For example, the server 200 may include a first server (for example, Android Market such as Google Play Store or AppStore of Apple) including the applications 210 and a second server (or second and third servers) including the application meta DB 220 and/or the controller meta DB 230. The electronic device 100 may download an application by accessing the server 200 and install the downloaded application thereto. Additionally, the application meta DB 220 and the controller meta DB 230 in the server 200 may correspond to the application meta DB 143 and the controller meta DB 145 in the electronic device 100, respectively. A DB stored in the server 200 may include relatively more records than a DB stored in the memory 140 of the electronic device 100. For example, when the electronic device 100 is not able to check information corresponding to the application 141 from the application meta DB 143, it may check or download corresponding information from the application meta DB 220 of the server 200 by accessing the server 200. An embodiment relating to this is described with reference to FIG. 7.

Figure 3:
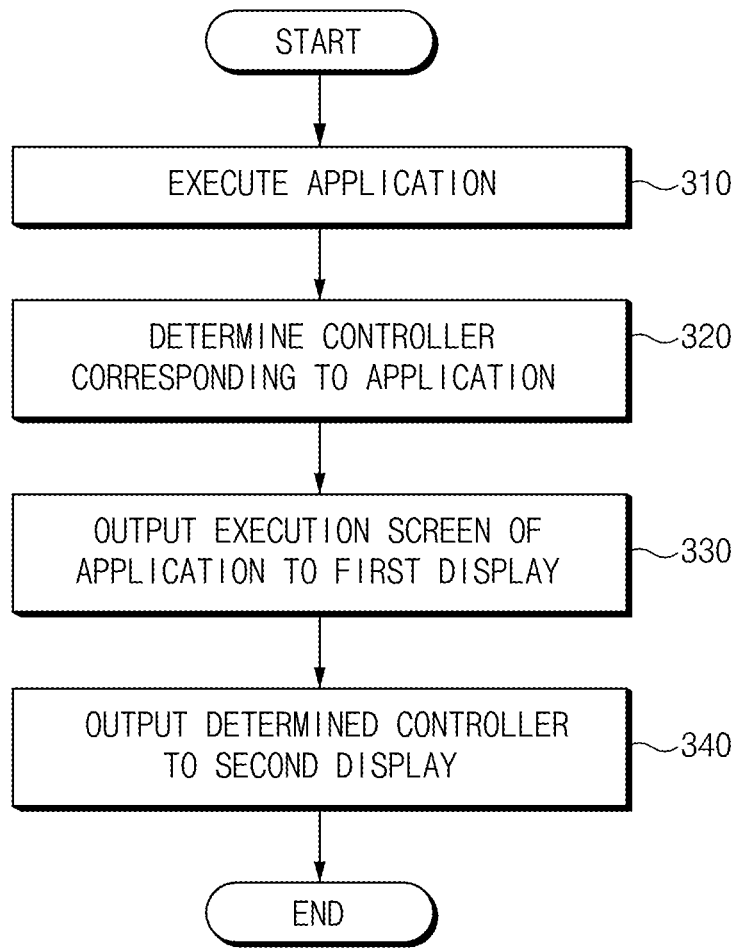
FIG. 3 is a view illustrating a process for providing a controller appropriate for application according to an embodiment of the present disclosure.

FIG. 3 is a view illustrating a process for providing a controller appropriate for application according to an embodiment of the present disclosure.

Referring to FIG. 3, in operation 310, the electronic device 100 (for example, the processor 130) may execute an application (for example, the application 141). The application may be an application provided together with a controller or an application to which a controller is required to be provided during application execution. Alternatively, the application may be an application that does not provide a controller. For example, when executing a game application, the electronic device 100 may output, to the first display 110, an execution screen for selecting a menu or selecting a character or a car type at the initial execution. When a controller is required to be provided during the execution of a game application, the electronic device 100 may output an appropriate controller to the second display 120. According to an embodiment of the present disclosure, even if both the first display 110 and the second display 120 support touch and hovering inputs, the electronic device 100 may set a touch input not to be recognized on the first display 110 or ignore a touch input inputted through the first display 110, from a time point at which a controller is outputted to the second display 120. Through this, an unintended touch input may be prevented from occurring.

In operation 320, the electronic device 100 (for example, the processor 130) may determine a controller corresponding to an application. For example, the electronic device 100 may obtain unique identification information of an application, for example, the package name or predetermined serial number of an application and a hash value, from installation information of an application package or an application provided for the installation of the application. According to an embodiment of the present disclosure, when a controller corresponding to the unique identification information of an application is defined, the electronic device 100 may output the pre-defined controller to the second display 120. Alternatively, when a controller corresponding to the unique identification information of an application is not defined, the electronic device 100 may determine the type of an application, for example, the category of an application classified based on a controller appropriate for an application. For example, when an application is a racing game category, the electronic device 100 may output a controller appropriate for a racing game to the second display 120. For example, the electronic device 100 may output a controller including a handle (or a direction key), a brake, and an accelerator, to the second display 120.

The electronic device 100 may use the above-mentioned first DB and/or second DB to determine a controller appropriate for an application. In relation to a method of utilizing a specific DB, it will be described with reference to FIG. 4.

In operation 330, the electronic device 100 (for example, the processor 130) may output the execution screen of an application to the first display 110. Additionally, when a controller appropriate for an application is determined, in operation 340, the electronic device 100 may output the determined controller to the second display 120.

In relation to a process in FIG. 3 or described later, an order relationship of operations shown in the form of a flowchart is not limited. Unless logically inconsistent, the order relationship may be changed or two or more operations may be executed at the same time. For example, in a process of FIG. 3, operation 330 may be performed first and operation 320 may be performed before operation 340. That is, a process may be performed in the order of operation 310, operation 330, operation 320, and operation 340.

Figure 4:
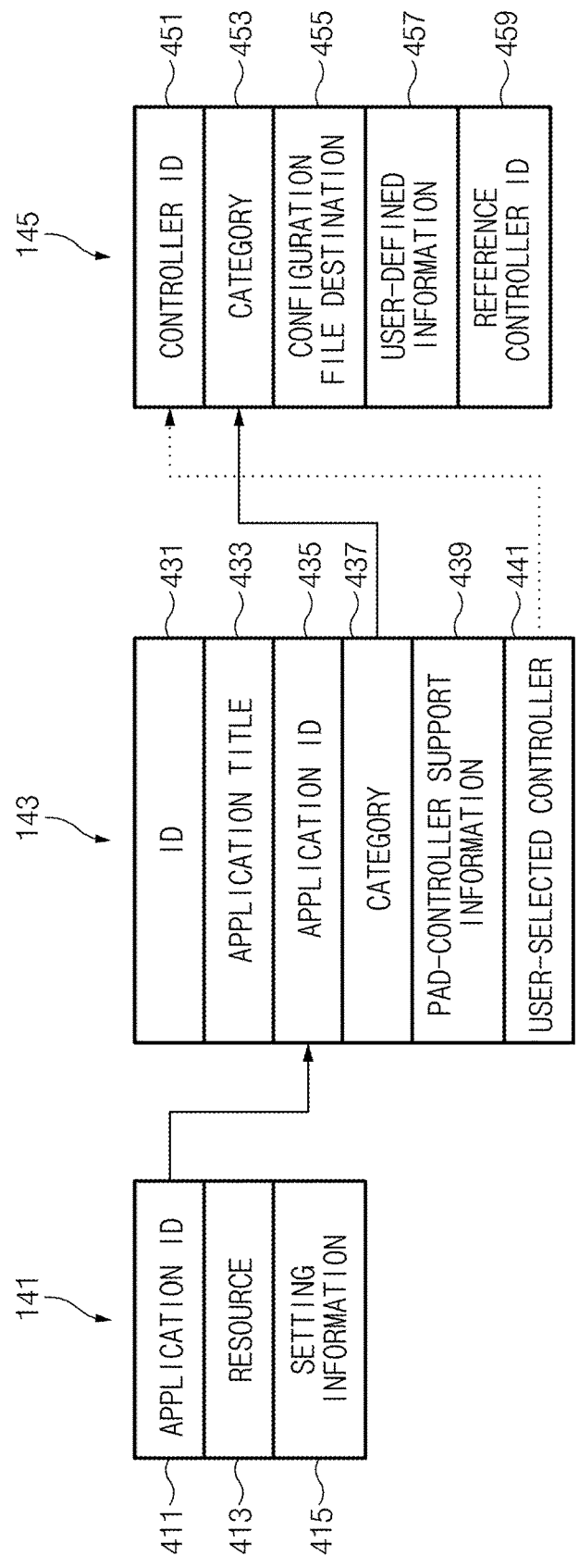
FIG. 4 is a view illustrating a reference relationship between databases (DBs) according to an embodiment of the present disclosure.

FIG. 4 is a view illustrating a reference relationship between DBs according to an embodiment of the present disclosure.

Referring to FIG. 4, an application 141 may include an application identification (ID) 411 that is the unique identification information of an application, a resource 413 including an execution file or image of an application and data relating to the execution of other applications, and setting information 415 including signature information and authority information of an application. For example, in the case of the Android operating system (OS), the application ID 411 may correspond to an application package name; the setting information 415 may correspond to an AndriodManifest file; and the resource 413 may correspond to other remaining files or information. According to an embodiment of the present disclosure, an application is installed from a source file such as an application package on the electronic device 100. According to an embodiment of the present disclosure, in this document, the application 141 may be understood as a concept including a source file such as an application package and a program (or application) installed from the source file and executable.

The processor 130 may check unique ID information from the application 141 and check whether there is data corresponding to corresponding unique ID information in the first DB (or, the application meta DB) 143. The application meta DB 143 may have a record list including fields of an ID 431, an application title 433, an application ID 435, a category 437, pad-controller support information 439 (for example, a pad-controller support flag), and a user-selected controller ID 441. That is, the application meta DB 143 includes a plurality of records, and each record may include the above-mentioned fields 431, 433, 435, 437, 439, and 441. A similar description may be applied to the controller meta DB 145.

The ID 431 may correspond to information (for example, a serial number) for identifying each record. The application title 433, as the name of an application, may correspond to a name identifiable in a UI when an application is installed on the electronic device 100. The application ID 435 may correspond to unique ID information identifiable by each application when an application is installed on the electronic device 100. For example, other unique values such as the package name of an Android application or a hash value may correspond to the application ID 435. In the first DB 143, the ID 431 and the application ID 435 have unique values. The ID 431 may be omitted.

The category 437, as a reference for determining a controller appropriate for an application, may correspond to the classification of the types of applications in which a specific controller is utilized. For example, in the case of a game application, the category 437 may have a value of one of action games, racing games, role playing games (RPGs), simulation games, puzzle games, and touch games According to an embodiment of the present disclosure, a category is for an application in which a pre-defined controller is not applicable and a controller corresponding to a category may correspond to a controller that is directly created by a user.

The pad-controller support information 439 may represent whether a corresponding application is controllable in linkage with a physical external controller. Alternatively, according to an embodiment of the present disclosure, the pad-controller support information 439 may represent whether it is appropriate that a corresponding application is driven using a pad-type controller such as Xbox or Nintendo. The field 439 may have a value of yes/no or 0/1.

The user-selected controller ID 441 represents the ID of a corresponding controller when a controller to be used during the driving of a corresponding application is pre-defined. The field 441 may have a value and may have no value.

The processor 130 may check a record having the application ID 435 identical (or corresponding) to the application ID 411 of the application 141. When a record is checked, the processor 130 may determine whether there is a specified value in the user-selected controller ID 441 in the record. If there is a specified value in the user-selected controller ID 441, the processor 130 may output a controller having a specified value (for example, a controller ID 451) in the second DB 145 to the second display 120. If there is no specified value in the field 441, the processor 130 may check the category 437, determine a controller having the category 453 corresponding to the category 437 from the second DB 145, and output the determined controller to the second display 120. A process relating to this is described with reference to FIGS. 5, 7, and 8.

The second DB (or the controller meta DB) 145 may include the controller ID 451, a category 453, a configuration file destination 455, user-defined information (for example, a user-defined flag) 457, and a reference controller ID 459. The category 453 may correspond to the category 437 of the first DB 143. For example, when the category 437 is RPG, the processor 130 may output, to the second display 120, an appropriate controller (for example, a controller having the highest user ratings) among controllers whose category 453 is RPG.

The configuration file destination 455 may represent the location of a file that defines a UI of a controller. The file, for example, may use a tag of a markup language such as extensible markup language (XML). The UI of the controller may be stored in a structured document type by using a variety of languages (for example, XML, JavaScript Object Notation (JSON), personal home page (PHP), hypertext markup language (HTML), extensible HTML (XHTML), and dynamic HTML (DHTML)) For example, as in the example below, the file, location, and size of a background (<background>), a stick (<stick>) (for example, a joystick), and a button (<button>) may be defined in the file. The processor 130 may output a controller to the second display 120 based on a file that defines this UI.

```
<?xml version="1.0" encoding="UTF-8"?>
<background src="image/background.png" width=800 height=600 />
<stick>
<stick id="A" src="image/Button_A.png" x=80 y=300 width=100 height=100>
</stick>
<button>
<button id="A" src="image/Button_A.png" x=320 y=480 width=30 height=30>
<button id="B" src="image/Button_B.png" x=360 y=460 width=30 height=30>
<button id="X" src="image/Button_X.png" x=320 y=440 width=30 height=30>
<button id="Y" src="image/Button_A.png" x=360 y=420 width=30 height=30>
<button id="select" src="image/Button_Select.png" x=200 y=440 width=60 height=20>
<button id="start" src="image/Button_Start.png" x=200 y=420 width=60 height=20>
</button>
<feature>
<feature id="chat" src="image/Button_Chat.png" x=120 y=200 width=50 height=50>
<feature id="screenshot" src="image/Button_Screenshot.png" x=180 y=200 width=50 height=50>
<feature id="record" src="image/Button_Record.png" x=240 y=200 width=50 height=50>
<feature id="edit" src="image/Button_Edit.png" x=300 y=200 width=50 height=50>
</feature>
```

The user-defined information 457 may represent whether a corresponding controller is a controller created or modified by a user. Additionally, when a corresponding controller is modified or created based on another controller, the reference controller ID 459 may have the controller ID (that is, the controller ID 451) of the referenced controller.

The DB and its fields described with reference to FIG. 4 are exemplary, and may be replaced with another field or a field may be added. For example, since a controller ID corresponding to one category exists in plurality, the second DB 145 may include an additional field such as priorities, ratings, preferences, the number of users, and the number of recommendations for determining the priority of the controller ID. Additionally, the first DB 143 and the second DB 145 may be understood as one DB having at least two tables.

Figure 5:
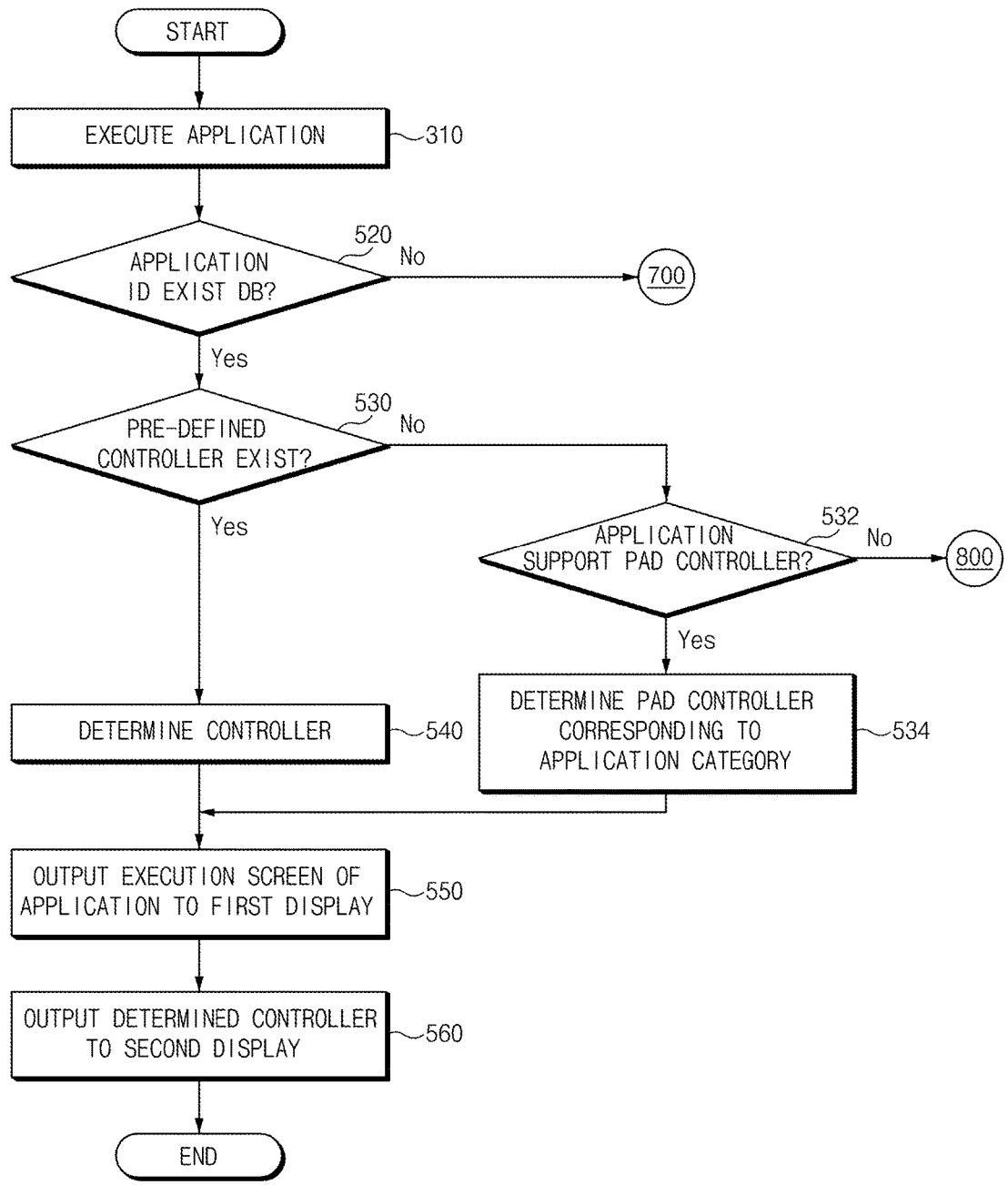
FIG. 5 is a flowchart illustrating a process for determining a controller appropriate for application according to an embodiment of the present disclosure.

FIG. 5 is a flowchart illustrating a process for determining a controller appropriate for application according to an embodiment of the present disclosure.

Referring to FIG. 5, operation 310 is the operation described with reference to FIG. 3 in which the electronic device 100 (for example, the processor 130) may execute an application. When the application is executed, the processor 130 may determine whether an application ID is in a DB (for example, the first DB 143) in operation 520. For example, the processor 130 may determine whether a record having a filed including the application ID value of the executed application is in the first DB 143 in operation 143.

When the application ID is checked from the DB and found, the electronic device 100 may check whether there is a pre-defined controller with respect to the checked application ID in operation 530. For example, the processor 130 may determine whether the field of the user-selected controller ID 441 specifies a specific controller ID in a corresponding record.

If there is a pre-defined controller with respect to the checked application ID in operation 530, the electronic device 100 may determine the pre-defined controller as a controller for the executed application in operation 540.

The electronic device 100 may output the execution screen of the application to the first display in operation 550. As mentioned with reference to FIG. 3, it is understood that operation 550 is performed immediately after operation 310.

In operation 560, the electronic device 100 may output the determined controller to the second display. For example, the processor 130 may check the configuration file destination 455 corresponding to the controller ID value of the determined controller in the second DB 145. The processor 130 may output a controller to the second display 120 based on a UI defined in a file corresponding to the configuration file destination 455.

In operation 520, for example, in the case of a relatively recently released application, the ID of the application may not be in a DB. In this case, the processor 130 may communicate with the server 200 in order to check the category or specified controller of the application ID. In relation to this, the processor 130 may perform operation 700. In relation to operation 700, description is made with reference to FIG. 7 below.

If there is no defined controller with respect to an application in operation 530, the electronic device 100 may perform operation 532. In operation 532, the processor 130 may determine whether an application supports a pad-type controller. For example, the processor 130 may check the pad-controller support information 439 in a DB.

If the application supports the pad controller based on the check result, the electronic device 100 may perform operation 534 for setting the pad controller. If the application does not support the pad controller, the electronic device 100 may perform operation 800 for setting a touch controller. In relation to operation 800, description is made with reference to FIG. 8 below.

In operation 534, the electronic device 100 may determine a pad controller corresponding to the category of an application. For example, the processor 130 may determine a category (for example, the category 437) corresponding to application identification information and determine an appropriate pad controller based on the determined category. An example of a pad controller will be described with reference to FIGS. 6A, 6B, and 6C.

Figure 6A:
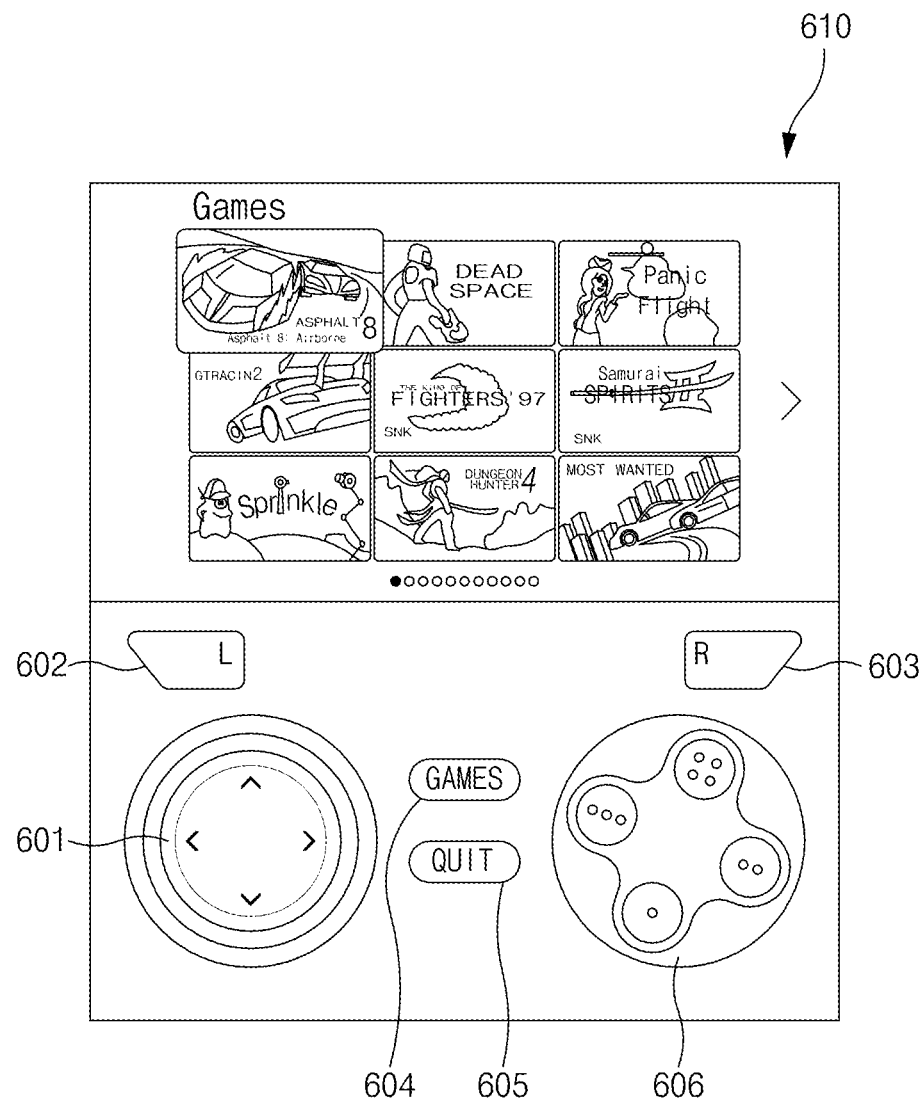
FIGS. 6A, 6B, and 6C are views illustrating an application execution screen and a controller of a different category according to an embodiment of the present disclosure.
Figure 6B:
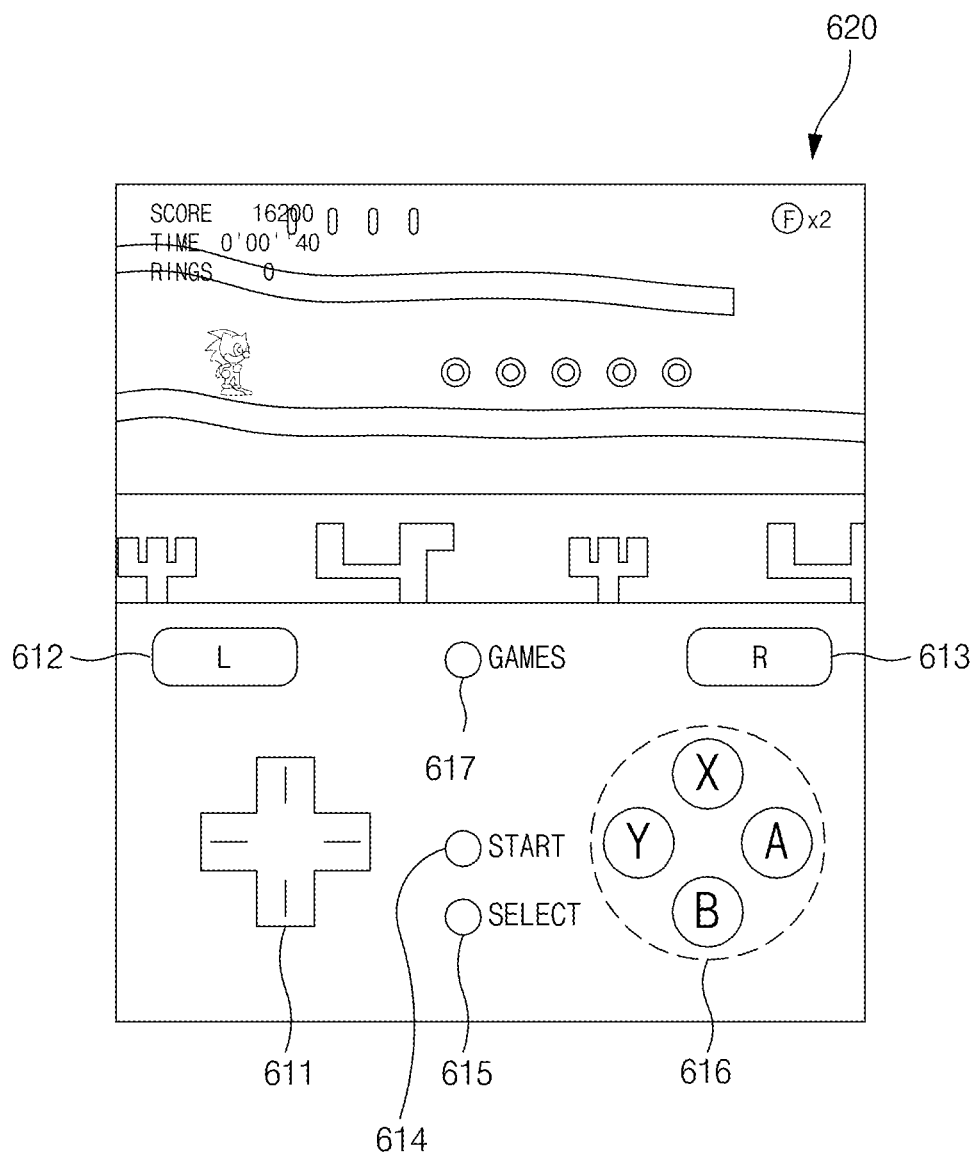
Figure 6C:
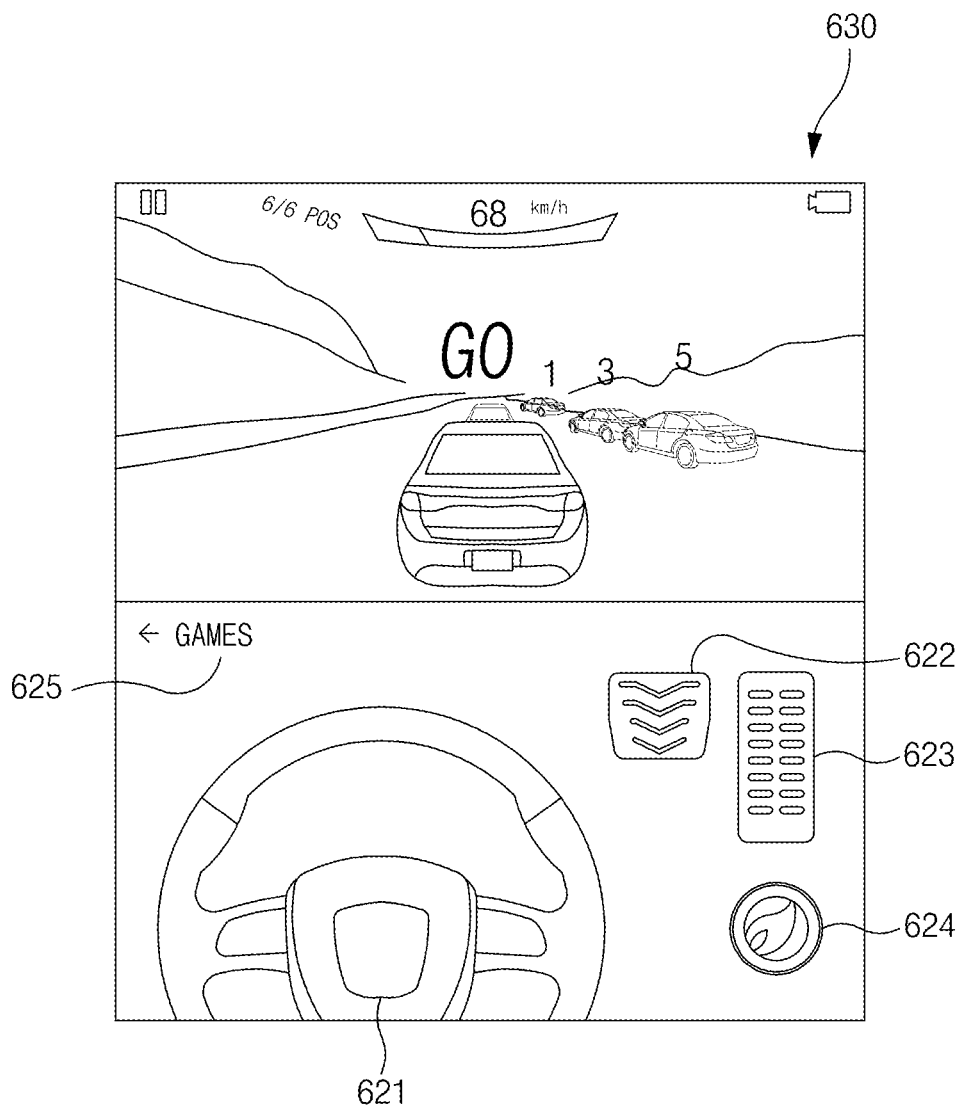

FIGS. 6A, 6B, and 6C are views illustrating an application execution screen and a controller of a different category according to an embodiment of the present disclosure.

FIG. 6A illustrates a pad controller corresponding to an execution screen 610. The execution screen 610 is a screen for selecting a game and since a specific game does not start yet, a general controller may be outputted. For example, a controller including a direction button 601, a left key 602, a right key 603, a game selection button 604, an end button 605, and other control buttons 606.

FIG. 6B illustrates a pad controller when a game in an RPG category is selected. When an execution screen 620 of RPG is outputted to the first display 110, the processor 130 may output a specified controller for the executed game or a controller corresponding to a category that the executed game belongs, to the second display 120. For example, a direction key 611, a left key 612, a right key 613, a start button 614, a selection button 615, a function key (for example, jump, accelerate, shoot, and so on) 616, and a game setting related key 617.

FIG. 6C illustrates a pad controller corresponding to an execution screen 630 of a game in a racing category. This controller may include a handle 621, a brake pedal 622, an acceleration pedal 623, an ignition plug button 624, and a game setting related button 625.

Figure 7:
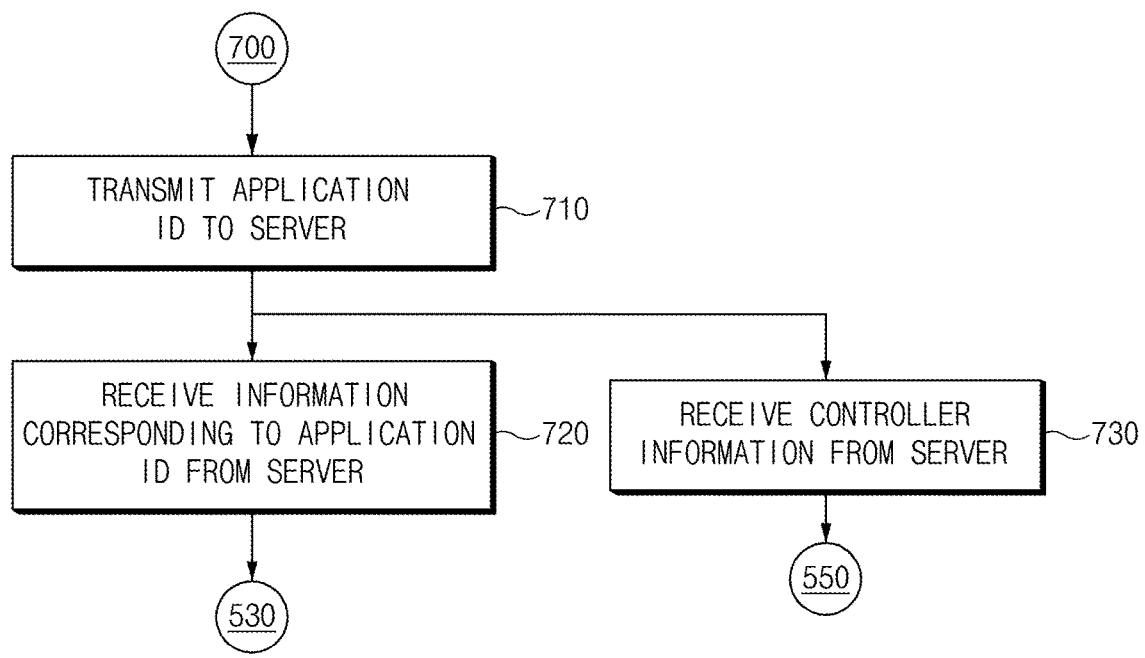
FIG. 7 is a view illustrating a process for determining a controller based on communication with a server according to an embodiment of the present disclosure.

FIG. 7 is a view illustrating a process for determining a controller based on communication with a server according to an embodiment of the present disclosure.

Referring to FIG. 7, when an application ID is not identified from a DB, the electronic device 100 (for example, the processor 130) may transmit unique identification information (for example, the application ID 411) to the server 200 through the communication module 150 in operation 710.

When receiving the identification information of an application from the electronic device 100, the server 200 may determine a pre-defined controller ID or category information corresponding to the received identification information of the application by referring to the application meta DB 220. Alternatively, according to an embodiment of the present disclosure, the server 200 may directly determine a controller based on the received identification information of the application and transmit information on the determined controller to the electronic device 100. When transmitting a determination result to the electronic device 100, the server 200 may transmit a record of the application meta DB 220 corresponding to the application identification information and/or a record of the controller meta DB 230 corresponding to the controller ID, to the electronic device 100.

In operation 720, the electronic device 100 may receive a controller ID or category information corresponding to the application ID from the server 200 in response to the transmission. The processor 130, for example, may determine a controller from the second DB 145 based on the received information, for example, by using the received controller ID or category. Since a subsequent operation corresponds to a process after operation 530 of FIG. 5, its description is omitted.

As another example, the electronic device 100 may receive controller information from the server 200 in response to the transmission in operation 730. Herein, the controller information may include a file that defines a UI in a controller. The processor 130 may output a controller to the second display 120 based on the received information. Since a subsequent operation corresponds to a process after operation 550 of FIG. 5, its description is omitted.

In the embodiment of FIG. 7, the electronic device 100 may update a DB stored in the memory 140 by using information (for example, a record) provided from the server 200.

Figure 8:
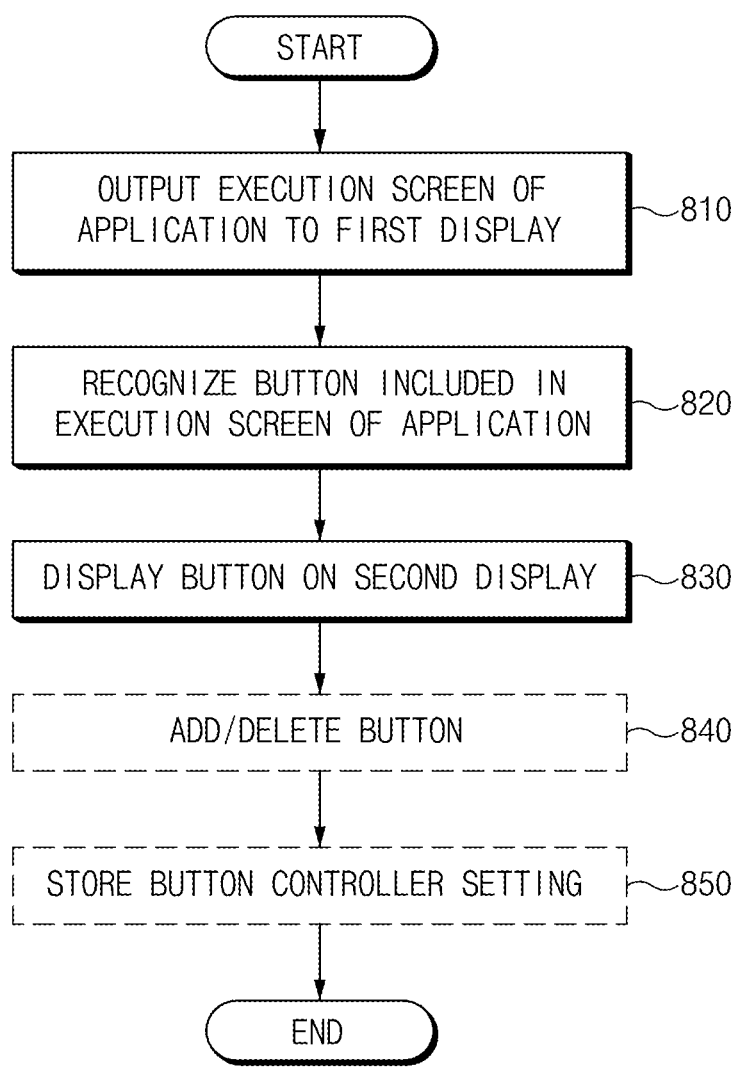
FIG. 8 is a flowchart illustrating a process for setting a button controller according to an embodiment of the present disclosure.

FIG. 8 is a flowchart illustrating a process for setting a button controller according to an embodiment of the present disclosure. The process of FIG. 8 may be performed at a time point (that is, after operation 532 is performed) that it is determined that a pad controller is not supported, and may be performed at a time point that a user requests the creation of a button controller when a game is in progress by using a touch function according to an embodiment of the present disclosure.

Referring to FIG. 8, in operation 810, the electronic device 100 (for example, the processor 130) may output the execution screen of an application to the first display 110. Operation 810 may correspond to operation 550 described above.

In operation 820, the electronic device 100 may recognize a button control area included in the execution screen of an application. Based on the recognition performance, the processor 130 may copy the execution screen to another display. For example, a specific frame in the execution screen outputted to the first display 110 may be copied to the second display 220. The processor 130 may recognize a button based on the copied screen or recognize a button directly from the execution screen. The processor 130 may recognize, as a button, an object that the size of a button area corresponds to a size that is generally used in an application among objects recognized as buttons.

In operation 830, the electronic device 100 may display the recognized button on the second display 220. The displayed button may have the character of a basic guide controller. If a button is recognized incorrectly or requires editing, operation 840 may be performed.

In operation 840, editing a button such as adding or deleting a button may be performed. For example, when a touch and hovering input on the displayed button occurs, the processor 130 may delete a corresponding button from a recognition target button. If a touch and hovering input on an area that is not recognized as a button occurs, the processor 130 may add a corresponding area as a recognized touch (or button) and hovering area. Additionally, a button position may be adjusted through a touch and drag input.

In operation 850, the electronic device 100 may store the setting of a button controller. A process for performing the button editing of the button controller as in operation 840 and operation 850 may be applied to a pad controller in a similar manner. For example, changing the addition, deletion, position, and size of a control area for a control item included in a pad controller may be performed.

According to an embodiment of the present disclosure, the processor 130 may store information on recognized buttons in a DB with respect to one controller ID. In relation to this, it will be described with reference to FIG. 11.

Figure 9:
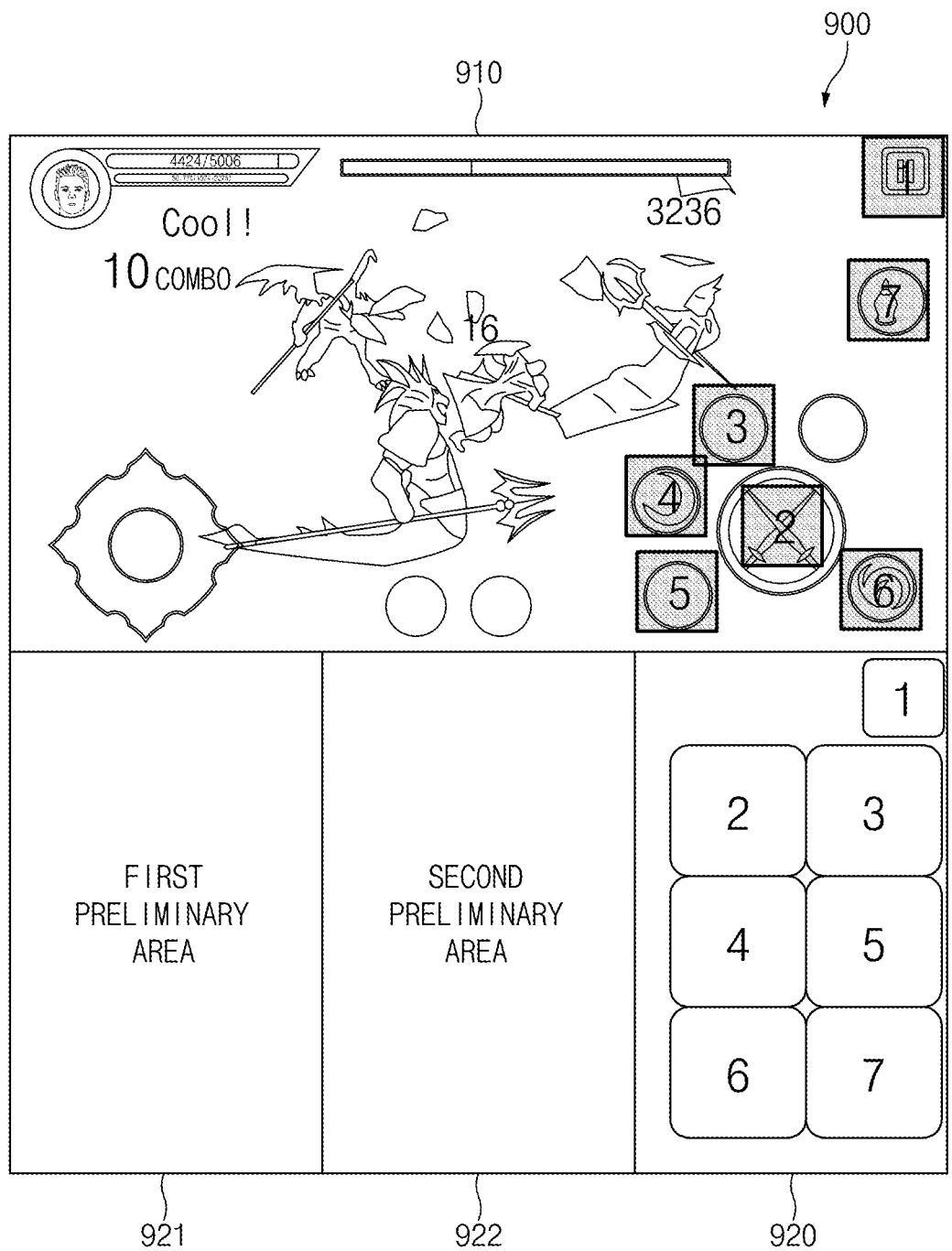
FIG. 9 is a view illustrating a button controller according to an embodiment of the present disclosure.

FIG. 9 is a view illustrating a button controller according to an embodiment of the present disclosure.

Referring to FIG. 9, according to an embodiment of the present disclosure, when an application is executed as shown in an execution screen 910 or a user's specific input occurs, the processor 130 may recognize a button included in the execution screen 910. For example, a button included in the execution screen 910 may be recognized in addition to a button controller 920. Buttons corresponding to 1 to 7 in the execution screen 910 may respectively correspond to buttons corresponding to 1 to 7 in the button controller 920.

When a user selects the button 2, the button 2 may be deleted from the button controller 920. Additionally, when a user selects an unrecognized arbitrary position in the execution screen 910, a button corresponding to a corresponding position may be added to the button controller 920.

Additionally, since it is efficient that buttons included in the button controller 920 are concentrated in a specific area and distributed in order for fast input, the entire screen 900 may include a first preliminary area 921 and a second preliminary area 922 in addition to the execution screen 910 and the button controller 920. An appropriate button or menu may be added to the first preliminary area 921 or the second preliminary area 922. Additionally, according to an embodiment of the present disclosure, the entire screen 900 may be configured with the execution screen 910 and the button controller 920 without a preliminary area.

Figure 10:
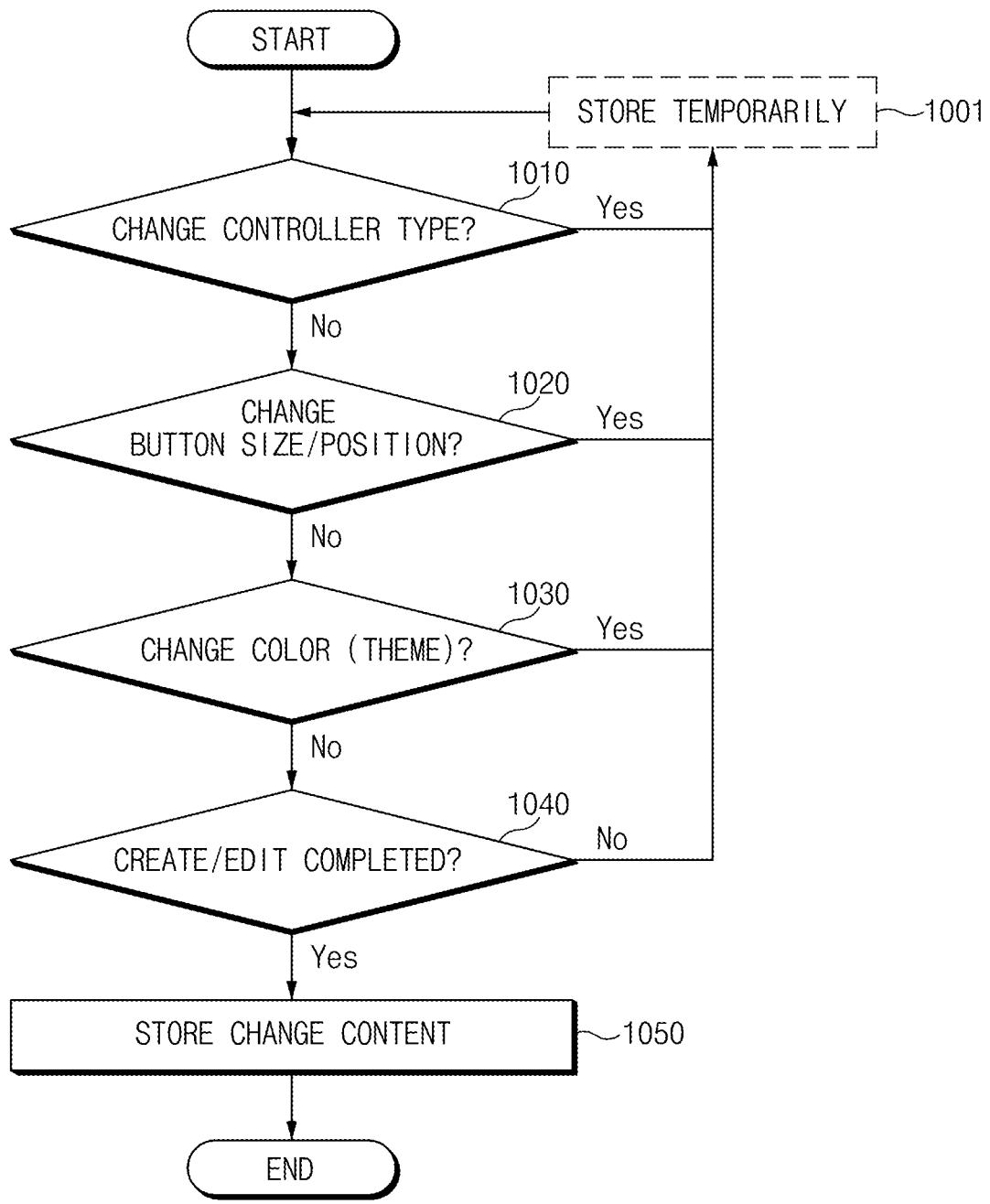
FIG. 10 is a flowchart illustrating a process for changing a controller according to an embodiment of the present disclosure.

FIG. 10 is a flowchart illustrating a process for changing a controller according to an embodiment of the present disclosure.

The process of FIG. 10 may be applied to a button for configuring the pad controller or a button for configuring a button controller.

Referring to FIG. 10, when an editing process of a controller starts, in operation 1010, the electronic device 100 (for example, the processor 130) may change a controller type or kind. For example, when a racing game is executed, in a case that a controller is provided as shown in FIG. 6A, a user may change it to the controller shown in FIG. 6C or a button controller.

In operation 1020, the electronic device 100 (for example, the processor 130) may change the position or size of a button or a control object in a controller. Additionally, in operation 1030, the electronic device 100 (for example, the processor 130) may change the color or theme of a controller. For example, the processor 130 may change the color of some buttons or an object in a controller or change the theme of a controller (for example, a change from a PlayStation theme to a Nintendo theme). In operation 1040, the electronic device 100 (for example, the processor 130) may determine if the create/edit process is completed.

When it is determined that there is a change in any of operations 1010, 1020, and 1030, the electronic device 100 (for example, the processor 130) may store a change item temporarily in operation 1001. On the other hand, if no changes are made in operations 1010, 1020, and 1030 and it is determined in operation 1040 that the create/edit process is not complete, the electronic device (for example, the processor 130) may return to the beginning of the procedure without executing operation 1001 as there have been no changes to store. In operation 1050, when an input for storing a change content occurs, the processor 130 may terminate a change process of a controller. The processor 130 may allocate information on a changed controller, for example, a new controller ID 451, to the second DB 145 and store it. When an original controller is changed partially, controller ID information of the original controller may be stored in the reference controller ID 459. Additionally, the processor 130 may create a markup document file corresponding to a changed UI and store the path of the created file in the configuration file destination 455.

Figure 11:
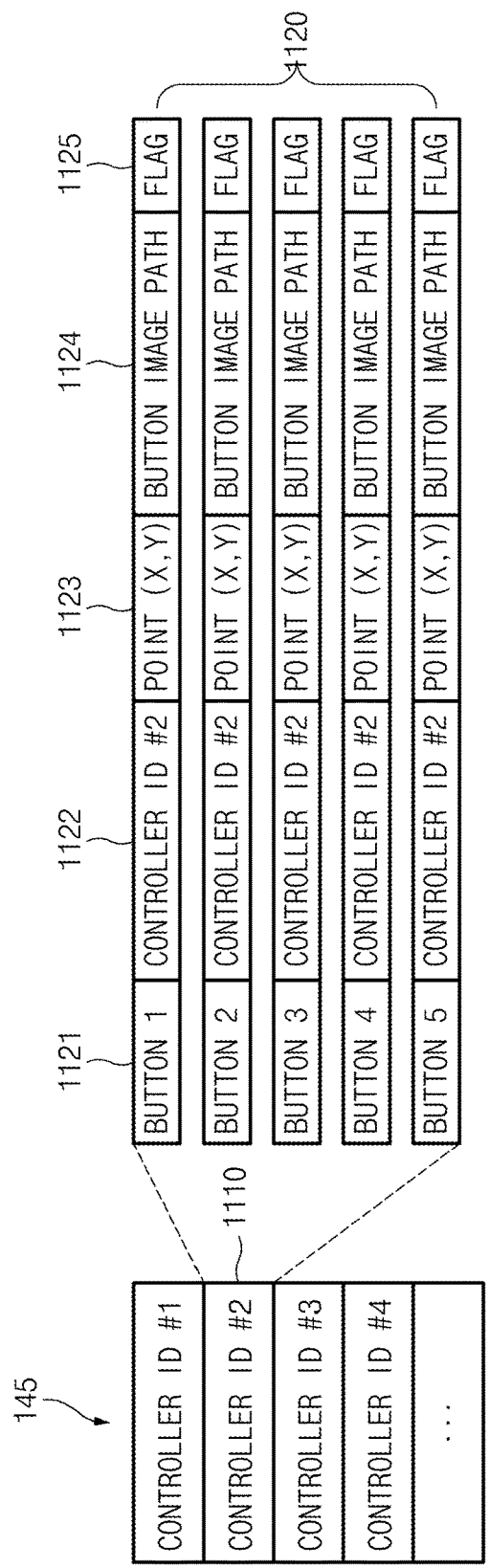
FIG. 11 is a view illustrating mapping of buttons that configure a button controller and a controller according to an embodiment of the present disclosure.

FIG. 11 is a view illustrating mapping of buttons that configure a button controller and a controller according to an embodiment of the present disclosure.

Referring to FIG. 11, a second DB 145 may include a controller list. Each record included in the list may be identified by a controller ID. When the controller ID corresponds to a button controller, a record corresponding to each of at least one button configuring a button controller may correspond to the controller ID.

For example, when a controller ID #2 1110 is a button controller including five buttons, it may correspond to information 1120 corresponding to each button in a one-to-many relationship. Each information 1120 may include a button ID field 1121, a controller ID field 1122, a button coordinates (center coordinates) field 1123, a button image path field 1124 when a button is an image, and another flag field 1125. Herein, all the controller ID fields 1122 may have a value corresponding to the controller ID #2.

Figure 12:
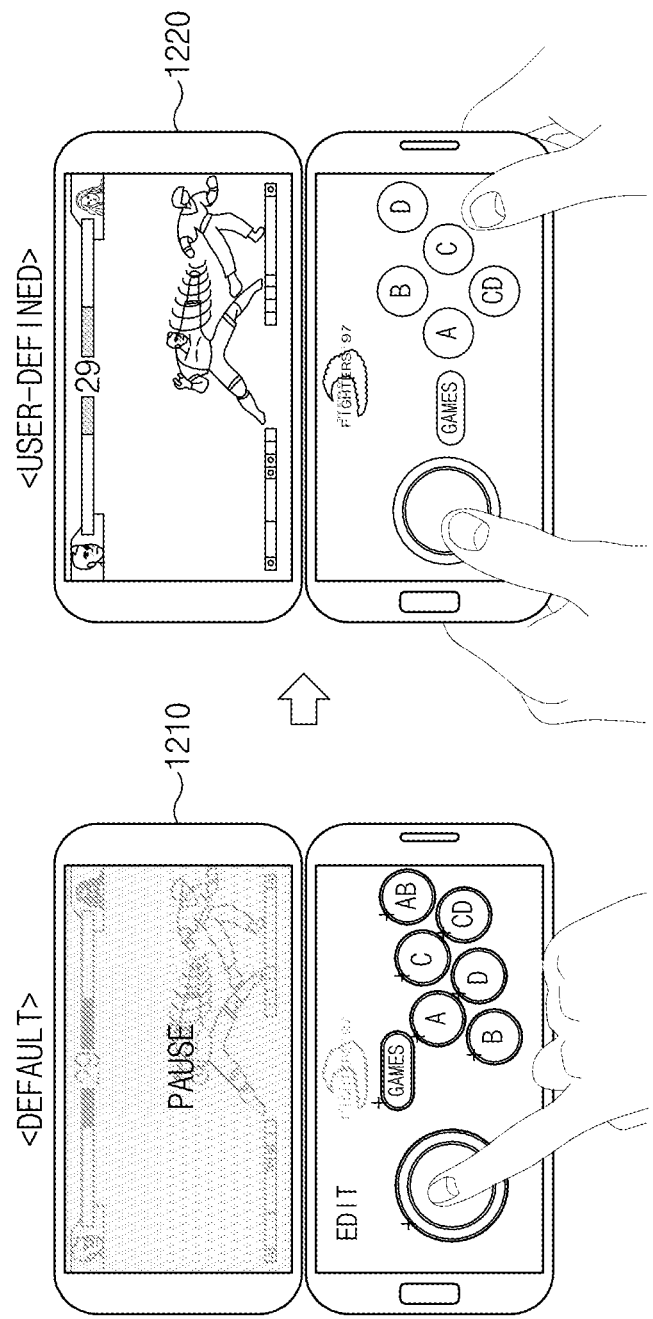
FIG. 12 illustrates a user adjustable controller according to an embodiment of the present disclosure.
Figure 13:
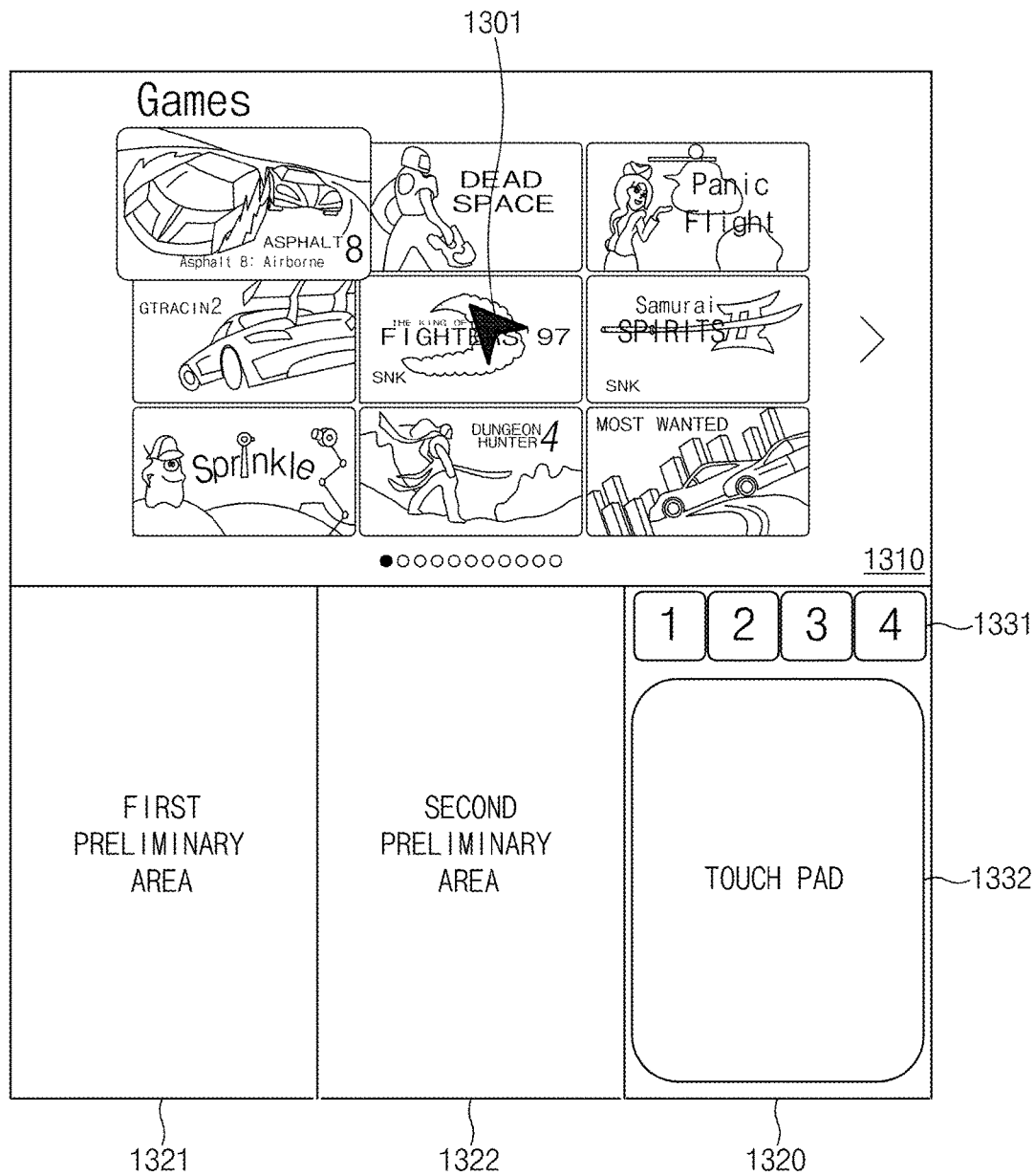
FIG. 13 is a view illustrating an example of controlling a cursor through a controller according to an embodiment of the present disclosure.

FIGS. 12 and 13 are views of an available controller.

FIG. 12 illustrates a user adjustable controller according to an embodiment of the present disclosure.

Referring to FIG. 12, a screen 1210 may correspond to a screen where a default controller is displayed. When the position of an object configuring a controller is inconvenient or there is an object not in use during the use of a game by using a default controller, a user may pause the execution of an application and edit a controller. In this case, the process of FIG. 10 may be performed by the electronic device 100.

For example, in the controller of the screen 1210, when a button AB is not used and the positions of buttons A, B, C, D, and CD are inconvenient for use, a user may remove the button AB and adjust the positions of the buttons A, B, C, D, and CD as show in a screen 1220, and then play the game again.

FIG. 13 is a view illustrating an example of controlling a cursor through a controller according to an embodiment of the present disclosure.

Referring to FIG. 13, a first preliminary area 1321 and a second preliminary area 1322 in FIG. 13 correspond to those of FIG. 9, and thus, their descriptions are omitted.

When a cursor is displayed on a screen 1310, a controller 1320 including a touch pad 1332 may be provided. Predefined functions (for example, select, delete, exit, and so on) may be respectively allocated to buttons 1331 specified by 1, 2, 3, and 4. Additionally, a user may control a cursor 1301 by providing a gesture input such as a touch or drag to a touch pad linked to the cursor 1301. For example, when a user input occurs through the touch pad 1332, the processor 130 may move the cursor 1301 in a method corresponding to the user input or perform an operation for selecting a target where the cursor 1301 is disposed, by mapping the user input to the cursor 1301. Alternatively, the processor 130 may perform a specified operation/function in response to a gesture input inputted through the touch pad 1332, for example, a touch input such as swipe or double tap.

Figure 14:
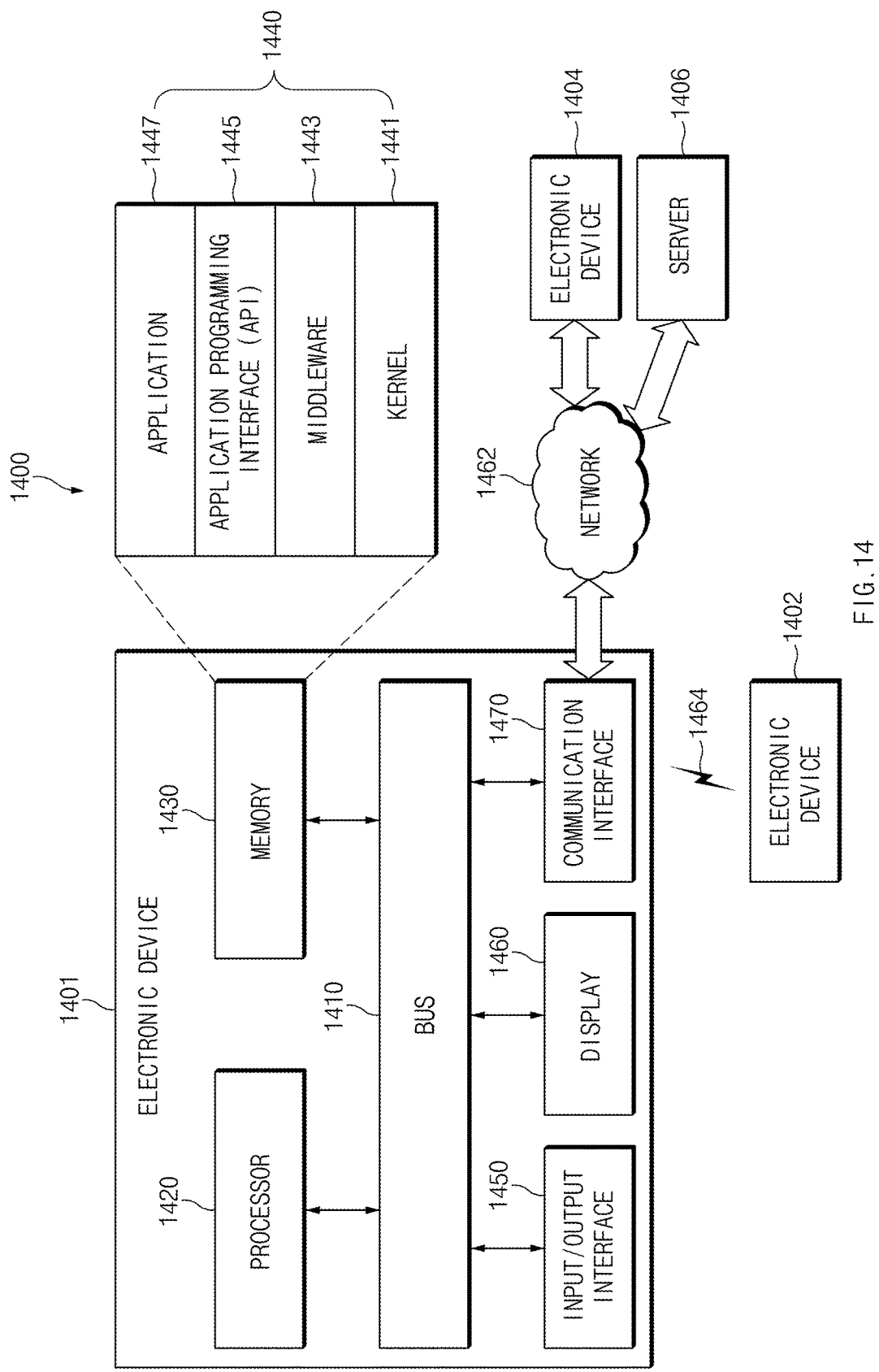
FIG. 14 is a view illustrating an electronic device in a network environment according to various embodiments of the present disclosure.

FIG. 14 is a view illustrating an electronic device in a network environment according to various embodiments of the present disclosure.

Referring to FIG. 14, according to various embodiments of the present disclosure, electronic devices 1401, 1402, and 1404 and a server 1406 may be connected to each other through a network 1462 or a short-range communication 1464 in a network environment 1400. The electronic device 1401 may include a bus 1410, a processor 1420, a memory 1430, an input/output interface 1450, a display 1460, and a communication interface 1470. According to an embodiment of the present disclosure, the electronic device 1401 may omit at least one of the components or may additionally include a different component.

The bus 1410, for example, may include a circuit for connecting the components 1410 to 1470 to each other and delivering a communication (for example, control message and/or data) between the components 1410 to 1470.

The processor 1420 may include at least one of a CPU, an AP, and a communication processor (CP). The processor 1420, for example, may execute calculation or data processing for control and/or communication of at least one another component of the electronic device 1401.

The memory 1430 may include volatile and/or nonvolatile memory. The memory 1430, for example, may store instructions or data relating to at least one another component of the electronic device 1401. According to an embodiment of the present disclosure, the memory 1430 may store software and/or a program 1440. The program 1440 may include a kernel 1441, a middleware 1443, an application programming interface (API) 1445, and/or an application program (or an application) 1447. At least part of the kernel 1441, the middleware 1443, and the API 1445 may be called an OS.

The kernel 1441, for example, may control or manage system resources (for example, the bus 1410, the processor 1420, the memory 1430, and so on) used for performing operations or functions implemented in other programs (for example, the middleware 1443, the API 1445, or the application program 1447). Additionally, the kernel 1441 may provide an interface for controlling or managing system resources by accessing an individual component of the electronic device 1401 from the middleware 1443, the API 1445, or the application program 1447.

The middleware 1443, for example, may serve as an intermediary role for exchanging data as the API 1445 or the application program 1447 communicates with the kernel 1441.

Additionally, the middleware 1443 may process at least one job request received from the application program 1447 according to a priority. For example, the middleware 1443 may assign to at least one application program 1447 a priority for using a system resource (for example, the bus 1410, the processor 1420, or the memory 1430) of the electronic device 1401. For example, the middleware 1443 may perform scheduling or load balancing on the at least one job request by processing the at least one job request according to the priority assigned to the at least one job request.

The API 1445, as an interface for allowing the application program 1447 to control a function provided from the kernel 1441 or the middleware 1443, may include at least one interface or function (for example, an instruction) for file control, window control, image processing, or character control.

The input/output interface 1450, for example, may serve as an interface for delivering instructions or data inputted from a user or another external device to another component(s) of the electronic device 1401. Additionally, the input/output interface 1450 may output instructions or data received from another component(s) of the electronic device 1401 to a user or another external device.

The display 1460, for example, may include a liquid crystal display (LCD), a light emitting diode (LED) display, an organic LED (OLED) display, a microelectromechanical systems (MEMS) display, or an electronic paper display. The display 1460 may display various contents (for example, text, image, video, icon, symbol, and so on) to a user. The display 1460 may include a touch screen, and for example, may receive a touch, gesture, proximity, or hovering input by using an electronic pen or a user's body part.

The communication interface 1470, for example, may set a communication between the electronic device 1401 and an external device (for example, the first external electronic device 1402, the second external electronic device 1404, or the server 1406). For example, the communication interface 1470 may communicate with an external device (for example, the second external electronic device 1404 or the server 1406) in connection to the network 1462 through wireless communication or wired communication.

The wireless communication, as a cellular communication protocol, may use at least one of long-term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM), and so on. Additionally, the wireless communication, for example, may include the short-range communication 1464. The short range communication 1464, for example, may include at least one of Wi-Fi, Bluetooth (BT), near field communication (NFC), magnetic stripe transmission (MST), or GNSS.

The MST may generate pulses by using magnetic signals according to transmission data and the pulses may generate magnetic signals. The electronic device 1401 may transmit the magnetic signals to a point of sales (POS) and the POS may detect the magnetic signals by using an MST reader and restore the data by converting the detected magnetic signals into electrical signals.

The global navigation satellite system (GNSS) may include at least one of GPS, Glonass, Beidou Navigation Satellite System (hereinafter referred to as Beidou), and Galileo, that is, the European global satellite-based navigation system. Hereinafter, global positioning system (GPS) and GNSS may be interchangeably used. The wired communication, for example, may include at least one of universal serial bus (USB), high definition multimedia interface (HDMI), recommended standard 1532 (RS-232), and plain old telephone service (POTS). The network 1462 may include telecommunications network, for example, at least one of computer network (for example, local area network (LAN) or wide-area network (WAN)), internet, and telephone network.

Each of the first and second external electronic devices 1402 and 1404 may have the same type as or a different type from the electronic device 1401. According to an embodiment of the present disclosure, the server 1406 may include a group of one or more servers. According to various embodiments of the present disclosure, all or part of operations executed on the electronic device 1401 may be executed on another one or more electronic devices (for example, the electronic device 1402 or 1404 or the server 1406). According to an embodiment of the present disclosure, when the electronic device 1401 performs a certain function or service automatically or by a request, it may request at least part of a function relating thereto from another device (for example, the electronic device 1402 or 1404 or the server 1406) instead of or in addition to executing the function or service by itself. The other electronic device (for example, the external electronic device 1402 or 1404 or the server 1406) may execute a requested function or an additional function and may deliver an execution result to the electronic device 1401. The electronic device 1401 may provide the requested function or service as it is or by processing the received result additionally. For this, for example, cloud computing, distributed computing, or client-server computing technology may be used.

Figure 15:
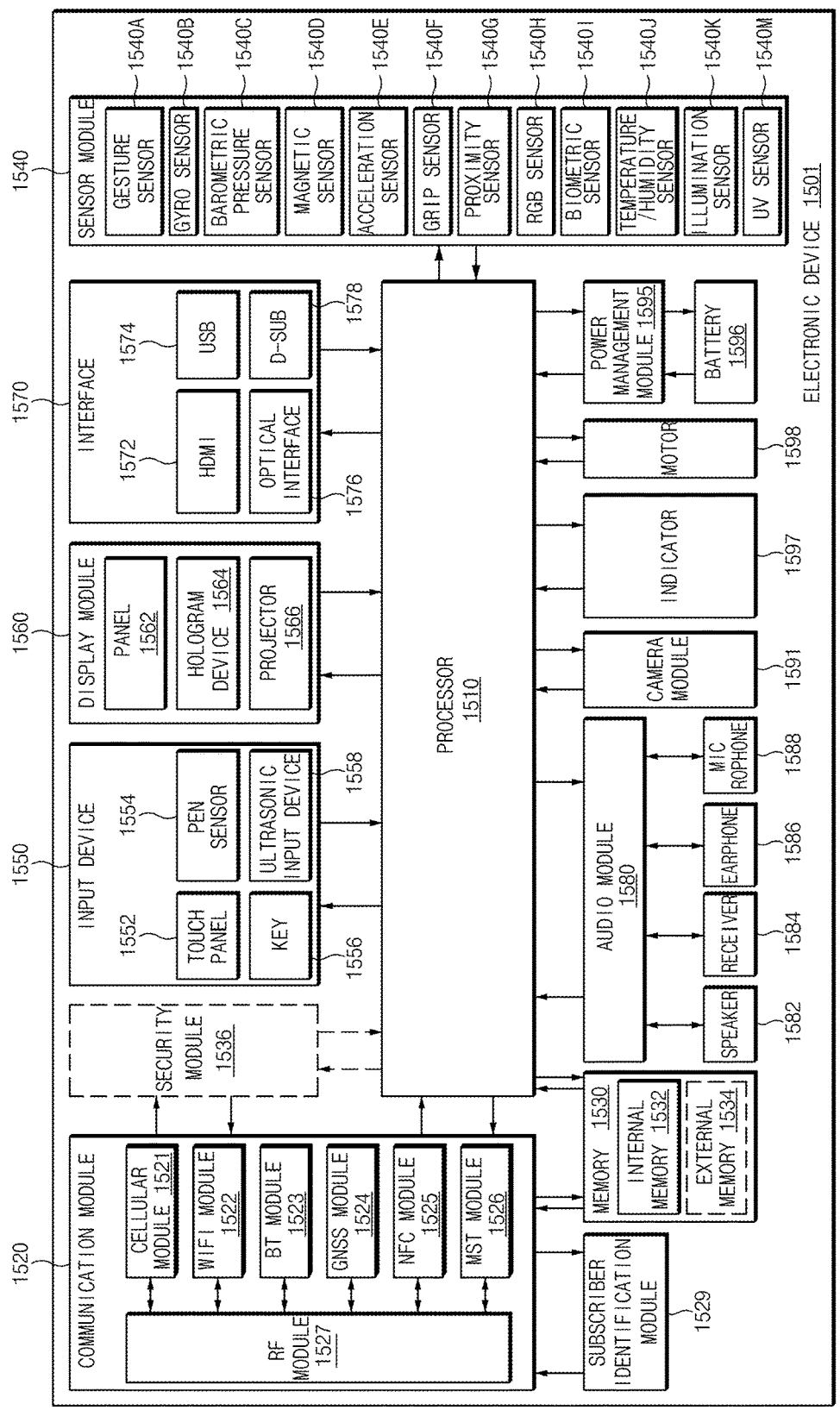
FIG. 15 is a block diagram of an electronic device according to various embodiments of the present disclosure.

FIG. 15 is a block diagram of an electronic device according to various embodiments of the present disclosure.

Referring to FIG. 15, an electronic device 1501, for example, may configure all or part of the above-mentioned electronic device 1401 shown in FIG. 14. The electronic device 1501 may include at least one processor (for example, an AP 1510), a communication module 1520, a subscriber identification module (SIM) 1529, a memory 1530, a security module 1536, a sensor module 1540, an input device 1550, a display 1560, an interface 1570, an audio module 1580, a camera module 1591, a power management module 1595, a battery 1596, an indicator 1597, and a motor 1598.

The processor 1510 may control a plurality of hardware or software components connected thereto and also may perform various data processing and operations by executing an OS or an application program. The processor 1510 may be implemented with a SoC, for example. According to an embodiment of the present disclosure, the processor 1510 may further include a graphic processing unit (GPU) (not shown) and/or an image signal processor (ISP). The processor 1510 may include at least part (for example, a cellular module 1521) of components shown in FIG. 15. The processor 1510 may load commands or data received from at least one of other components (for example, nonvolatile memory) and process them and may store various data in a nonvolatile memory.

The communication module 1520 may have the same or similar configuration to the communication interface 1470 of FIG. 14. The communication module 1520 may include the cellular module 1521, a Wi-Fi module 1522, a BT module 1523, a GNSS module 1524 (for example, a GPS module, a Glonass module, a Beidou module, or a Galileo module), an NFC module 1525, an MST module 1526, and a radio frequency (RF) module 1527.

The cellular module 1521, for example, may provide voice call, video call, text service, or internet service through communication network. According to an embodiment of the present disclosure, the cellular module 1521 may perform a distinction and authentication operation on the electronic device 1501 in a communication network by using a subscriber identification module (SIM) (for example, a SIM card) 1529. According to an embodiment of the present disclosure, the cellular module 1521 may perform at least part of a function that the processor 1510 provides. According to an embodiment of the present disclosure, the cellular module 1521 may further include a CP.

Each of the Wi-Fi module 1522, the BT module 1523, the GNSS module 1524, the NFC module 1525, and the MST module 1526 may include a processor for processing data transmitted/received through a corresponding module. According to an embodiment of the present disclosure, at least part (for example, two or more) of the cellular module 1521, the Wi-Fi module 1522, the BT module 1523, the GNSS module 1524, the NFC module 1525, and the MST module 1526 may be included in one integrated chip (IC) or IC package.

The RF module 1527, for example, may transmit/receive communication signals (for example, RF signals). The RF module 1527, for example, may include a transceiver, a power amp module (PAM), a frequency filter, a low noise amplifier (LNA), or an antenna. According to another embodiment of the present disclosure, at least one of the cellular module 1521, the Wi-Fi module 1522, the BT module 1523, the GNSS module 1524, the NFC module 1525, and the MST module 1526 may transmit/receive RF signals through a separate RF module.

The SIM 1529, for example, may include a card including a SIM and/or an embedded SIM and also may include unique identification information (for example, an integrated circuit card identifier (ICCID)) or subscriber information (for example, an international mobile subscriber identity (IMSI)).

The memory 1530 (for example, the memory 1430) may include an internal memory 1532 or an external memory 1534. The internal memory 1532 may include at least one of a volatile memory (for example, dynamic random access memory (DRAM), static RAM (SRAM), synchronous DRAM (SDRAM)) and a non-volatile memory (for example, one time programmable read-only memory (OTPROM), programmable ROM (PROM), erasable and programmable ROM (EPROM), electrically EPROM (EEPROM), mask ROM, flash ROM, flash memory (for example, NAND flash memory or NOR flash memory), hard drive, or solid state drive (SSD)).

The external memory 1534 may further include flash drive, for example, compact flash (CF), secure digital (SD), micro-SD, mini-SD, extreme digital (xD), (multimedia card (MMC), or a memorystick. The external memory 1534 may be functionally and/or physically connected to the electronic device 1501 through various interfaces.

The security module 1536, as a module including a storage space having a relatively higher security level than the memory 1530, may be a circuit for securing safe data storage and protected execution environment. The security module 1536 may be implemented as a separate circuit and may include an additional processor. The security module 1536, for example, may be in a detachable smart chip or a SD card or may include an embedded secure element (eSE) embedded in a fixed chip of the electronic device 1501. Additionally, the security module 1536 may run on a different OS from the electronic device 1501. For example, the security module 1536 may run based on java card open platform (JCOP) OS.

The sensor module 1540 measures physical quantities or detects an operating state of the electronic device 1501, thereby converting the measured or detected information into electrical signals. The sensor module 1540 may include at least one of a gesture sensor 1540A, a gyro sensor 1540B, a barometric pressure sensor 1540C, a magnetic sensor 1540D, an acceleration sensor 1540E, a grip sensor 1540F, a proximity sensor 1540G, a color sensor 1540H (for example, a red, green, blue (RGB) sensor), a biometric sensor 1540I, a temperature/humidity sensor 1540J, an illumination sensor 1540K, and an ultra violet (UV) sensor 1540M. Additionally or alternatively, the sensor module 1540 may include an E-nose sensor, an electromyography (EMG) sensor, an electroencephalogram (EEG) sensor, an electrocardiogram (ECG) sensor, an infrared (IR) sensor, an iris sensor, or a fingerprint sensor. The sensor module 1540 may further include a control circuit for controlling at least one sensor therein. According to an embodiment of the present disclosure, the electronic device 1501 may further include a processor configured to control the sensor module 1540 as part of or separately from the processor 1510 and thus may control the sensor module 1540 while the processor 1510 is in a sleep state.

The input device 1550 may include a touch panel 1552, a (digital) pen sensor 1554, a key 1556, or an ultrasonic input device 1558. The touch panel 1552 may use at least one of capacitive, resistive, infrared, or ultrasonic methods, for example. Additionally, the touch panel 1552 may further include a control circuit. The touch panel 1552 may further include a tactile layer to provide tactile response to a user.

The (digital) pen sensor 1554, for example, may include a sheet for recognition as part of a touch panel or a separate sheet for recognition. The key 1556 may include a physical button, an optical key, or a keypad, for example. The ultrasonic input device 1558 may detect ultrasonic waves generated from an input tool through a microphone (for example, a microphone 1588) in order to check data corresponding to the detected ultrasonic waves.

The display 1560 (for example, the display 1460) may include a panel 1562, a hologram device 1564, or a projector 1566. The panel 1562 may have the same or similar configuration to the display 1460 of FIG. 14. The panel 1562 may be implemented to be flexible, transparent, or wearable, for example. The panel 1562 and the touch panel 1552 may be configured with one module. The hologram device 1564 may show three-dimensional images in the air by using the interference of light. The projector 1566 may display an image by projecting light on a screen. The screen, for example, may be placed inside or outside the electronic device 1501. According to an embodiment of the present disclosure, the display 1560 may further include a control circuit for controlling the panel 1562, the hologram device 1564, or the projector 1566.

The interface 1570 may include a HDMI 1572, a USB 1574, an optical interface 1576, or a D-subminiature (D-sub) 1578, for example. The interface 1570, for example, may be included in the communication interface 1470 shown in FIG. 14. Additionally or alternatively, the interface 1570 may include a mobile high-definition link (MHL) interface, a SD card/MMC interface, or an infrared data association (IrDA) standard interface.

The audio module 1580 may convert sound into electrical signals and convert electrical signals into sounds. At least some components of the audio module 1580, for example, may be included in the input/output interface 1450 shown in FIG. 14. The audio module 1580 may process sound information inputted/outputted through a speaker 1582, a receiver 1584, an earphone 1586, or the microphone 1588.

The camera module 1591, as a device for capturing a still image and a video, may include at least one image sensor (for example, a front sensor or a rear sensor), a lens (not shown), an ISP (not shown), or a flash (not shown) (for example, an LED or a xenon lamp).

The power management module 1595 may manage the power of the electronic device 1501. According to an embodiment of the present disclosure, the power management module 1595 may include a power management IC (PMIC), a charger IC, or a battery or fuel gauge, for example. The PMIC may have a wired and/or wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added. The battery gauge may measure the remaining amount of the battery 1596, or a voltage, current, or temperature thereof during charging. The battery 1596, for example, may include a rechargeable battery and/or a solar battery.

The indicator 1597 may display a specific state of the electronic device 1501 or part thereof (for example, the processor 1510), for example, a booting state, a message state, or a charging state. The motor 1598 may convert electrical signals into mechanical vibration and may generate vibration or haptic effect. Although not shown in the drawings, the electronic device 1501 may include a processing device (for example, a GPU) for mobile TV support. A processing device for mobile TV support may process media data according to the standards such as digital multimedia broadcasting (DMB), digital video broadcasting (DVB), or mediaFLO™.

Each of the above-mentioned components of the electronic device according to various embodiments of the present disclosure may be configured with at least one component and the name of a corresponding component may vary according to the kind of an electronic device. According to various embodiments of the present disclosure, an electronic device according to various embodiments of the present disclosure may include at least one of the above-mentioned components, may not include some of the above-mentioned components, or may further include another component. Additionally, some of components in an electronic device according to various embodiments of the present disclosure are configured as one entity, so that functions of previous corresponding components are performed identically.

According to embodiments disclosed in this document, by providing a controller appropriate for the characteristics of an application and a user preference through an electronic itself or in linkage with a server, user's convenience and application's utilization may be improved.

Besides that, various effects identified directly or indirectly may be provided through this specification.

The term "module" used in various embodiments of the present disclosure, for example, may mean a unit including a combination of at least one of hardware, software, and firmware. The term "module" and the term "unit", "logic", "logical block", "component", or "circuit" may be interchangeably used. A "module" may be a minimum unit or part of an integrally configured component. A "module" may be a minimum unit performing at least one function or part thereof. A "module" may be implemented mechanically or electronically. For example, "module" according to various embodiments of the present disclosure may include at least one of an application-specific integrated circuit (ASIC) chip performing certain operations, field-programmable gate arrays (FPGAs), or a programmable-logic device, all of which are known or to be developed in the future.

According to various embodiments of the present disclosure, at least part of a device (for example, modules or functions thereof) or a method (for example, operations) according to this disclosure, for example, as in a form of a programming module, may be implemented using an instruction stored in computer-readable storage media. When at least one processor (for example, the processor 1420) executes an instruction, it may perform a function corresponding to the instruction. The non-transitory computer-readable storage media may include the memory 1430, for example.

The non-transitory computer-readable storage media may include hard disks, floppy disks, magnetic media (for example, magnetic tape), optical media (for example, compact disc-ROM (CD-ROM), and DVD), magneto-optical media (for example, floptical disk), and hardware devices (for example, ROM, RAM, or flash memory). Additionally, a program instruction may include high-level language code executable by a computer using an interpreter in addition to machine code created by a complier. The hardware device may be configured to operate as at least one software module to perform an operation of various embodiments of the present disclosure and vice versa.

A module or a programming module according to various embodiments of the present disclosure may include at least one of the above-mentioned components, may not include some of the above-mentioned components, or may further include another component. Operations performed by a module, a programming module, or other components according to various embodiments of the present disclosure may be executed through a sequential, parallel, repetitive or heuristic method. Additionally, some operations may be executed in a different order or may be omitted. Or, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    at least one display;
    a memory configured to store an application and a database including information on a plurality of controllers; and
    a processor electrically connected to the at least one display and the memory,
    wherein the processor is configured to:
        display a content including at least one object in relation to an execution of the application in a first area of the display,
        determine a controller based on unique identification information of the application,
        output the determined controller to a second area of the display, and
        when the database includes no pre-determined controller for the unique identification information of the application, recognize a button object among the at least one object included in the execution screen of the application, and output the controller including a button corresponding to the recognized button object to the second area.

2. The electronic device of claim 1, wherein
    the at least one display comprises a first display and a second display;
    the first area corresponds to the first display; and
    the second area corresponds to the second display.

3. The electronic device of claim 1, wherein the processor is further configured to:
    determine a property corresponding to the application;
    when the property is a first property, display a first controller for moving the at least one object through the second area of the display; and
    when the property is a second property, display a second controller for moving the at least one object through the second area.

4. The electronic device of claim 1, wherein when the database includes information on the controller corresponding to the unique identification information of the application, the processor is further configured to output the controller to the second area based on the information on the controller.

5. The electronic device of claim 4, wherein the information on the controller comprises information on a file for defining a user interface (UI) of the controller and the processor is further configured to output the UI of the controller defined in the file to the second area.

6. The electronic device of claim 4, wherein when the database includes no pre-determined controller for the unique identification information of the application, the processor is further configured to determine the controller based on property information of the application.

7. The electronic device of claim 4, wherein when the database includes no pre-determined controller for the unique identification information of the application, the processor is further configured to determine whether the application supports a pad-type controller and output a pad-type controller or a button-type controller to the second area according to a result of the determination.

8. The electronic device of claim 1, further comprising a communication module,
wherein, when the application is not identified from the database, the processor is further configured to:
transmit the unique identification information of the application to a server through the communication module, and
output a controller determined based on a controller identification (ID) or category information of the application to the second area, wherein the controller ID or the category information is received, in response to the transmission, by the communication module from the server.

9. The electronic device of claim 8, wherein the processor is further configured to output the controller to the second area based on controller information received, in response to the transmission, from the server.

10. The electronic device of claim 8, wherein the processor is further configured to update the database based on information received from the server.

11. The electronic device of claim 6, wherein the processor is further configured to determine a controller having the highest priority among a plurality of controllers corresponding to the property information, as the controller.

12. The electronic device of claim 1, wherein, when a user input for changing a user interface (UI) of the controller outputted to the second area is received, the processor is further configured to change at least one of a number, size, position, and color of a control object included in the controller based on the user input.

13. The electronic device of claim 1, wherein when a user input for changing a user interface (UI) of the controller outputted to the second area is received, the processor is further configured to change a type or theme of the controller based on the user input.

14. The electronic device of claim 7, wherein the processor is further configured to:
output the button-type controller including the button corresponding to the recognized button object to the second area.

15. The electronic device of claim 14, wherein, when the recognized button object is selected, the processor is further configured to delete the button corresponding to the selected button object included in the button-type controller.

16. The electronic device of claim 14, wherein when an area including an unrecognized first button object is selected, the processor is further configured to add a first button corresponding to the selected area to the button-type controller.

17. A controller providing method of an electronic device, the method comprising:
executing an application;
displaying a content including at least one object in relation to an execution of the application, in a first area of a display functionally connected to the electronic device;
determining a controller for moving the at least one object based on unique identification of the application; and outputting the determined controller to a second area of the display; and
when the database includes no pre-determined controller for the unique identification information of the application, recognizing a button object among the at least one object included in the execution screen of the application, and outputting the controller including a button corresponding to the recognized button object to the second area.

18. The method of claim 17, wherein the outputting of the determined controller to the second area comprises:
when a property of the application is a first property, displaying a first controller for moving at least one object through the second area of the display; and
when a property of the application is a second property, displaying a second controller for moving the at least one object through the second area.

19. The method of claim 17, wherein the determining the controller comprises:
transmitting the unique identification information of the application to a server;
receiving controller information or category information from the server in response to the transmission; and
determining the controller based on the received information.

20. A non-transitory storage medium configured to store computer readable instructions, wherein the instructions are executable by at least one processor and when executed, allow an electronic device to:
execute an application;
display a content including at least one object in relation to an execution of the application, in a first area of a display functionally connected to the electronic device;
determine a controller for moving the at least one object based on unique identification of the applications and output the determined controller to a second area of the display; and
when the database includes no pre-determined controller for the unique identification information of the application, recognize a button object among the at least one object included in the execution screen of the application, and output the controller including a button corresponding to the recognized button object to the second area.

* * * * *